United States Patent
Dharia et al.

(10) Patent No.: US 11,428,550 B2
(45) Date of Patent: Aug. 30, 2022

(54) SENSOR REGION OF INTEREST SELECTION BASED ON MULTISENSOR DATA

(71) Applicant: Waymo LLC, Mountain View, CA (US)

(72) Inventors: Nirav Dharia, Milpitas, CA (US); Giulia Guidi, Mountain View, CA (US); Ralph Shepard, Menlo Park, CA (US); Vlad Cardei, Redwood City, CA (US); Lucian Ion, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 358 days.

(21) Appl. No.: 16/808,314

(22) Filed: Mar. 3, 2020

(65) Prior Publication Data
US 2021/0278257 A1 Sep. 9, 2021

(51) Int. Cl.
*G01D 5/353* (2006.01)
*G01S 13/89* (2006.01)
(Continued)

(52) U.S. Cl.
CPC .......... *G01D 5/35383* (2013.01); *G01S 13/89* (2013.01); *H04N 5/33* (2013.01); *G01S 7/4004* (2013.01)

(58) Field of Classification Search
None
See application file for complete search history.

(56) References Cited

U.S. PATENT DOCUMENTS 4,175,860 A * 11/1979 Bacus .................... G06V 20/69
356/39
4,692,806 A * 9/1987 Anderson ............... G06T 3/403
375/E7.046
(Continued)

FOREIGN PATENT DOCUMENTS

CN 106599828 4/2017
GB 2298538 A * 9/1996 ............. G01S 13/87

OTHER PUBLICATIONS

Wang et al., Cooperative Object Tracking and Composite Event Detection With Wireless Embedded Smart Cameras, IEEE Transactions on Image Processing, vol. 19, No. 10, Published Jun. 14, 2010, 20 pages.

(Continued)

*Primary Examiner* — Bernarr E Gregory
(74) *Attorney, Agent, or Firm* — McDonnell Boehnen Hulbert & Berghoff LLP

(57) ABSTRACT

A system may include a first sensor of a first type and a second sensor of a second different type and having a detector. A field of view of the second sensor may be formed by a plurality of regions of interest (ROIs) defined by the detector. Control circuitry of the system may be configured to perform operations including obtaining, from the first sensor, first sensor data representing an environment, and determining, based on the first sensor data, information associated with a feature of interest within the environment. The operations may also include determining, based on the information, a particular ROI that corresponds to an expected position of the feature at a later time, obtaining a plurality of ROI sensor data from the particular ROI instead of obtaining full-resolution sensor data, and analyzing the plurality of ROI sensor data to determine one or more attributes of the feature.

20 Claims, 12 Drawing Sheets

(51) Int. Cl.
*H04N 5/33* (2006.01)
*G01S 7/40* (2006.01)

(56) References Cited

U.S. PATENT DOCUMENTS

| | | |
|---|---|---|
| 9,285,893 B2 | 3/2016 | Holz |
| 9,508,014 B2 | 11/2016 | Lu et al. |
| 10,018,609 B2 | 7/2018 | Miller et al. |
| 10,345,447 B1 | 7/2019 | Hicks |
| 10,440,293 B1 | 10/2019 | Ihns |
| 10,447,966 B2 | 10/2019 | Ritchey et al. |
| 2008/0243439 A1* | 10/2008 | Runkle ............... G06V 10/255 702/182 |
| 2011/0063446 A1* | 3/2011 | McMordie ........... G06V 10/147 348/E7.086 |
| 2012/0053755 A1* | 3/2012 | Takagi ................. G01S 17/931 701/1 |
| 2016/0021302 A1* | 1/2016 | Cho .................... H04N 5/3454 348/349 |
| 2019/0042860 A1 | 2/2019 | Lee et al. |
| 2019/0095721 A1 | 3/2019 | Ion et al. |
| 2019/0135196 A1 | 5/2019 | Vaid et al. |

OTHER PUBLICATIONS

Quaritsch et al., Autonomous Multicamera Tracking on Embedded Smart Cameras, EURASIP Journal on Embedded Systems, vol. 2007, Article ID 92827, Published Jan. 2007, 10 pages.

\* cited by examiner

SENSOR REGION OF INTEREST SELECTION BASED ON MULTISENSOR DATA

BACKGROUND

An image sensor includes a plurality of light-sensing pixels that measure an intensity of light incident thereon and thereby collectively capture an image of an environment. A Bayer filter may be applied to the image sensor to allow the image sensor to generate color images of the environment. Image sensors may be used in a plurality of applications such as photography, robotics, and autonomous vehicles.

SUMMARY

An autonomous vehicle or robotic device may include a plurality of different types of sensors. Each sensor may be configured to gather sensor data of a different type and/or indicative of different aspects of the environment. Some sensors may be better at detecting certain aspects of a feature of interest, or may operate better under certain environmental conditions, than other sensors. Further, the fields of view of some sensors may be divided into a plurality of regions of interest (ROIs) that may be read-out independently of one another. These different types of sensors may coordinate with one another to facilitate the selection of one or more ROIs of a particular sensor from which ROI sensor data, rather than full-resolution sensor data, may be obtained. By selecting an ROI that includes a detected feature of interest, the obtained ROI sensor data may be used to more accurately determine the attributes, properties, or characteristics of the feature of interest. In some implementations, the different types of sensors may communicate with one another by way of a peer-to-peer network, rather than by way of a central control system, to reduce the delay in sharing of information among these sensors.

In a first example embodiment, a system is provided that includes a first sensor of a first type and a second sensor of a second type different from the first type. The second sensor includes at least one detector. A field of view of the second sensor is formed by a plurality of ROIs defined by the at least one detector. The system also includes control circuitry configured to perform operations, including obtaining, from the first sensor and at a first time, first sensor data representing an environment. The operations also include determining, based on the first sensor data, information associated with a feature of interest within the environment. The operations additionally include determining, based on the information, a particular ROI of the plurality of ROIs of the second sensor that corresponds to an expected position of the feature of interest within the environment at a second time later than the first time. The operations further include obtaining, from the second sensor, a plurality of ROI sensor data from the particular ROI instead of obtaining full-resolution sensor data that contains each respective ROI of the plurality of ROIs. The operations yet further include analyzing the plurality of ROI sensor data to determine one or more attributes of the feature of interest.

In a second example embodiment, a method is provided that includes obtaining, by control circuitry, from a first sensor of a first type, and at a first time, first sensor data representing an environment. The method also includes determining, by the control circuitry and based on the first sensor data, information associated with a feature of interest within the environment. The method additionally includes determining, by the control circuitry and based on the information, a particular ROI of a plurality of ROIs of a second sensor of a second type different from the first type and having at least one detector. A field of view of the second sensor is formed by the plurality of ROIs defined by the at least one detector. The particular ROI corresponds to an expected position of the feature of interest within the environment at a second time later than the first time. The method further includes obtaining, by the second sensor, a plurality of ROI sensor data from the particular ROI instead of obtaining full-resolution sensor data that contains each respective ROI of the plurality of ROIs. The method yet further includes analyzing, by the control circuitry, the plurality of ROI sensor data to determine one or more attributes of the feature of interest.

In a third example embodiment a non-transitory computer readable storage medium is provided having stored thereon instructions that, when executed by a computing device, cause the computing device to perform operations. The operations include obtaining, from a first sensor of a first type and at a first time, first sensor data representing an environment. The operations also include determining, based on the first sensor data, information associated with a feature of interest within the environment. The operations additionally include determining, based on the information, a particular ROI of a plurality of ROIs of a second sensor of a second type different from the first type and having at least one detector. A field of view of the second sensor is formed by the plurality of ROIs defined by the at least one detector. The particular ROI corresponds to an expected position of the feature of interest within the environment at a second time later than the first time. The operations further include obtaining a plurality of ROI sensor data from the particular ROI instead of obtaining full-resolution sensor data that contains each respective ROI of the plurality of ROIs. The operations yet further include analyzing the plurality of ROI sensor data to determine one or more attributes of the feature of interest.

In a fourth example embodiment, a system is provided that includes means for obtaining, from a first sensor of a first type and at a first time, first sensor data representing an environment. The system also includes means for determining, based on the first sensor data, information associated with a feature of interest within the environment. The system additionally includes means for determining, based on the information, a particular ROI of a plurality of ROIs of a second sensor of a second type different from the first type and having at least one detector. A field of view of the second sensor is formed by the plurality of ROIs defined by the at least one detector. The particular ROI corresponds to an expected position of the feature of interest within the environment at a second time later than the first time. The system further includes means for obtaining a plurality of ROI sensor data from the particular ROI instead of obtaining full-resolution sensor data that contains each respective ROI of the plurality of ROIs. The system yet further includes means for analyzing the plurality of ROI sensor data to determine one or more attributes of the feature of interest.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
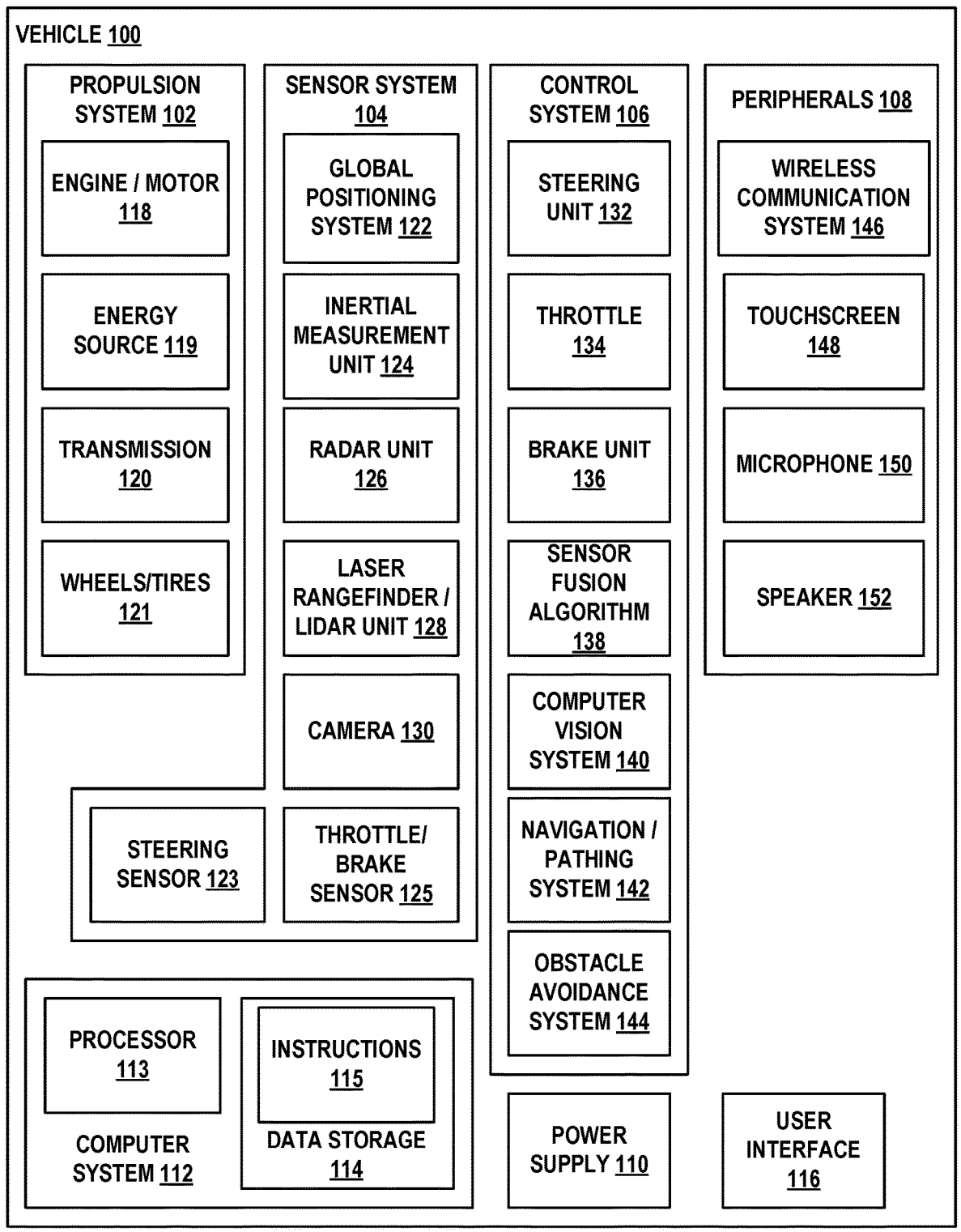
FIG. 1 illustrates a block diagram of a vehicle, in accordance with example embodiments.
Figure 2A:
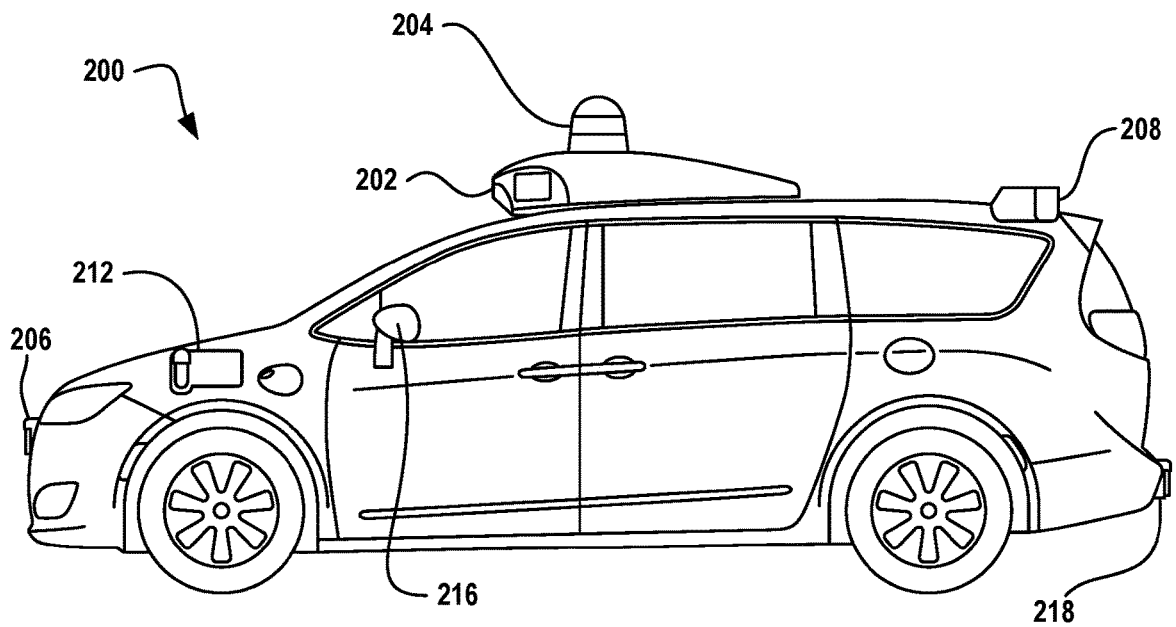
FIGS. 2A, 2B, 2C, 2D, and 2E illustrate a physical configuration of a vehicle, in accordance with example embodiments.
Figure 2B:
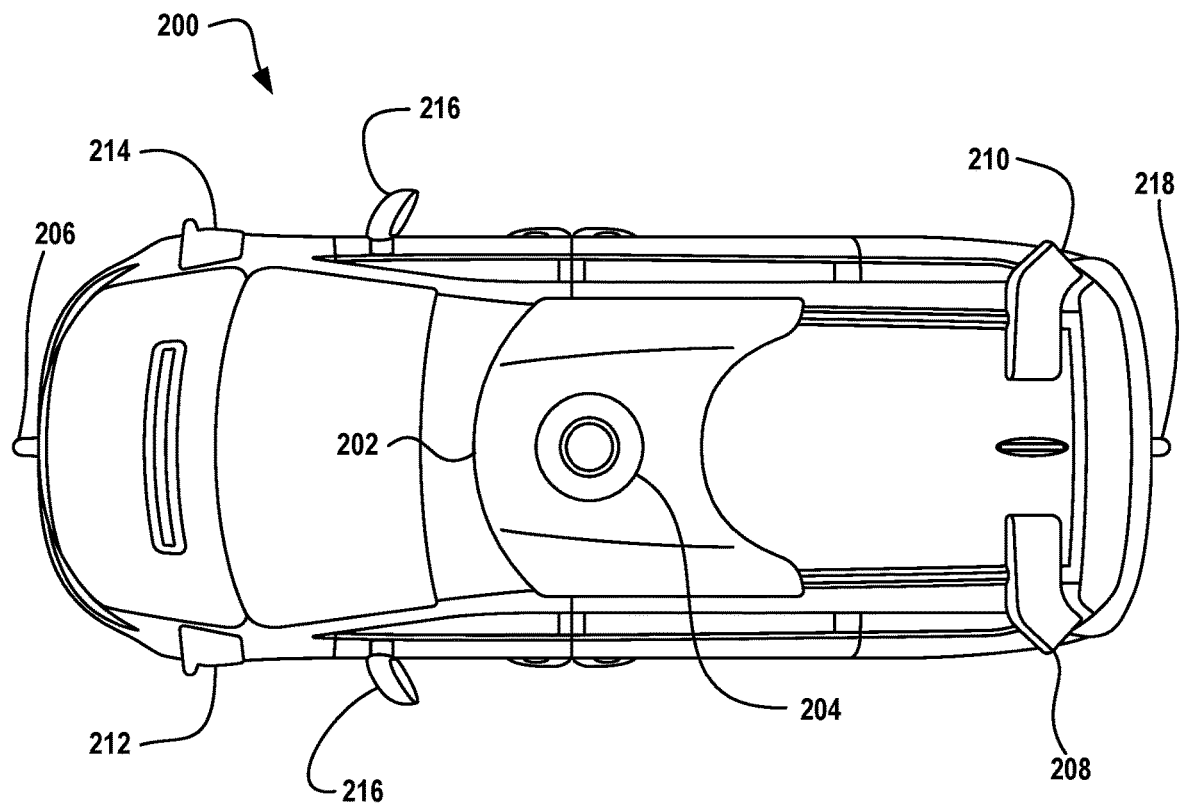
Figure 2C:
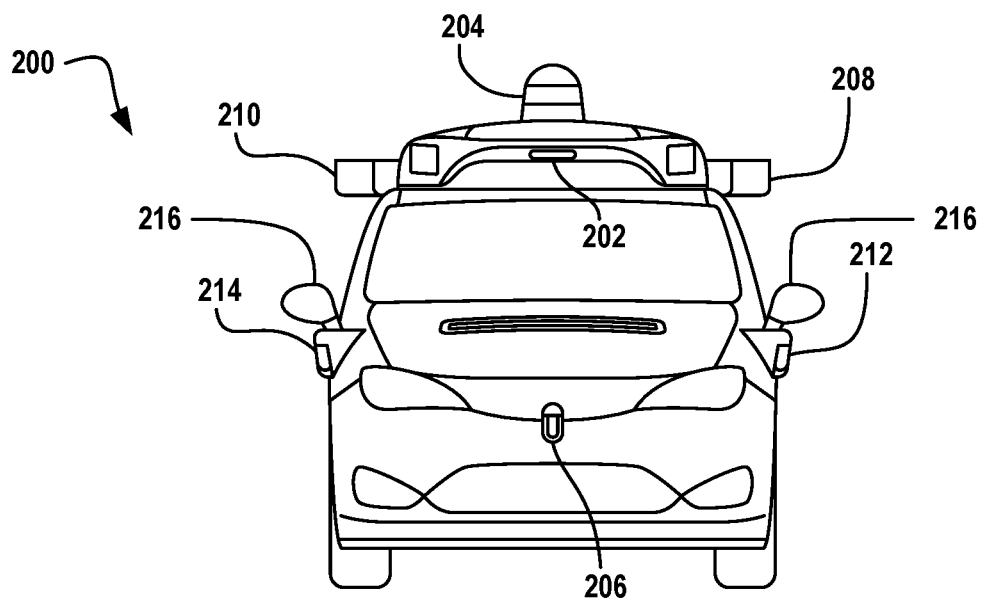
Figure 2D:
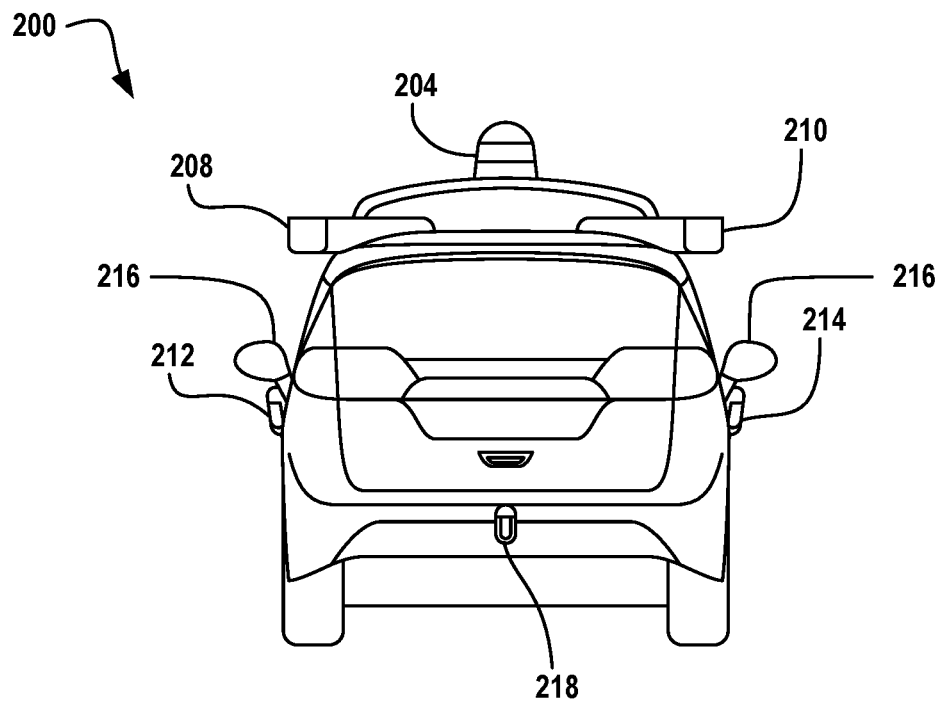
Figure 2E:
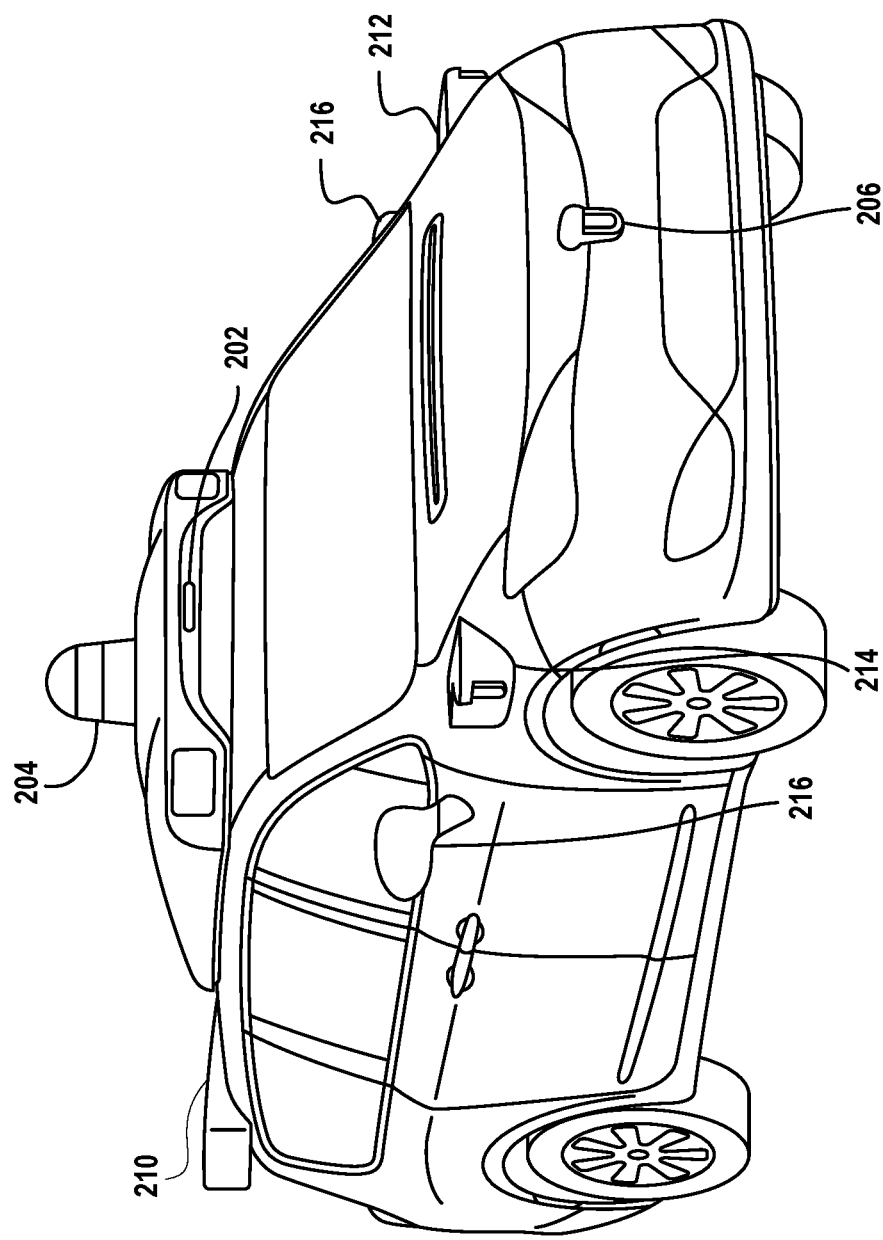

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Sensors may be provided on an autonomous vehicle or a robotic device to assist with perception of and navigation through various environments. These sensors may include image sensors, light detection and ranging (LIDAR) devices, radio detection and ranging (RADAR) devices, thermal cameras, and/or ultrasonic imaging devices, among other possibilities. These sensors may be capable of generating more data than can be timely processed by processing resources provided by the sensors and/or by the autonomous vehicle. This may be the case, for example, when a large number of sensors is provided on the vehicle and/or when the resolution of each sensor is high, resulting in generation of a large amount of sensor data. Additionally, desired data transfer latency and/or the amount of data transfer bandwidth available on the sensor and/or the autonomous vehicle may limit the amount of sensor data that can be utilized.

Generating and processing a larger amount of sensor data may, in general, be desirable as it may allow for detection, tracking, classification, and other analysis of features (e.g., objects) within the environment. In some cases, such features might be represented in a portion of a field of view of a particular sensor, rather than taking up the entirety of the field of view.

Accordingly, a sensor and corresponding circuitry may be provided that divide a field of view of the sensor into a plurality of regions of interest (ROIs) and allow for selective readout of sensor data from individual ROIs. Such a sensor may be herein referred to as an ROI-enabled sensor. For example, in the case of an image sensor, the pixels of the image sensor may form the plurality of ROIs, each of which may be read out independently of other ROIs. That is, the image sensor may generate image data in some ROIs (e.g., those that contain therein some feature of interest) while other ROIs (e.g., those that do not contain a feature of interest) are not used to generate image data. These ROIs may allow the image sensor to accommodate high frame rate and/or high resolution imaging while at the same time reducing the total amount of image data that is generated, analyzed, and/or transmitted.

The ROI-enabled sensor may operate in coordination with one or more other sensors of a different type provided on the autonomous vehicle. The one or more other sensors may be other ROI-enabled sensors or other non-ROI-enabled sensors. The one or more other sensors may be herein referred to as a first sensor, while the ROI-enabled sensor that utilizes data from the first sensor for ROI selection may be alternatively referred to as a second sensor.

In one example, an ROI-enabled image sensor may operate in coordination with one or more light detection and ranging (LIDAR) devices provided on the autonomous vehicle. Information obtained by way of the LIDAR device may be used to select a particular ROI from which to capture images, as well as imaging parameters according to which these images are captured.

Specifically, the LIDAR device may be configured to emit source pulses of light at an environment and measure return pulses that are reflected from one or more objects in the environment. The properties of the return pulses in relation to the source pulses may be indicative of various physical properties of features within the environment. For example, a time difference between emission of a source pulse and detection of a corresponding return pulse may be used to measure a distance between the LIDAR device and a corresponding point in the environment. Similarly, an intensity of a return pulse relative to an intensity of the corresponding source pulse may be indicative of a reflectivity of the corresponding point in the environment. Pulse width and Doppler shift, among others, may provide additional information about other physical properties of points in the environment.

Information obtained by the LIDAR device may be used to generate a point cloud representation of the environment. The point cloud may indicate the positions of various features within the environment, as well as other physical properties of these features as measured by the LIDAR. Thus, one or more features of interest (e.g., objects of interest) may be detected within the point cloud. A particular ROI of the image sensor expected to contain therein the feature of interest may be selected based on the point cloud. A plurality of ROI images may then be obtained from the particular ROI, allowing the feature of interest to be analyzed in more detail to determine one or more attributes thereof.

In some implementations, the physical properties of the feature of interest, as represented by the LIDAR data, may be used to select the particular ROI and/or the imaging parameters for the particular ROI. For example, reflectivity, speed, or distance to the feature of interest may be a basis for selecting the ROI. In another example, reflectivity of the feature of interest may be used to determine an exposure value and/or a gain value for the particular ROI. Similarly, a speed of the feature of interest may be used to select a frame rate with which to capture the ROI images. Further, a distance between the feature of interest and the LIDAR device and/or the camera may be used to select a zoom level for the ROI, a shape of the ROI, and/or size of the ROI.

In another example, the ROI-enabled image sensor may operate in coordination with one or more thermal cameras provided on the autonomous vehicle. Information obtained by way of the thermal camera may be used to select a particular ROI from which to capture images, as well as imaging parameters according to which these images are captured.

The thermal camera may be configured to generate radiometric images based on infrared radiation (e.g., radiation having wavelengths between 700 and 14,000 nanometers) emitted by objects within the environment. The radiometric images may be indicative of heat signatures within the environment, and may thus be used to detect humans and animals, among other objects of interest. Specifically, one or more objects of interest may be detected within the radiometric image. A particular ROI of the image sensor expected to contain therein the feature of interest may be selected based on the radiometric image. A plurality of ROI images may then be obtained from the particular ROI, allowing the feature of interest to be analyzed in more detail to determine one or more attributes thereof.

Such an arrangement may be beneficial in low-light conditions, such as during night time driving or while driving through tunnels. For example, the radiometric images may facilitate detection of features of interest that generate a heat signature but that might otherwise be difficult to detect in low-light conditions using non-thermal imaging. The radiometric images may thus also facilitate selection of an ROI from which to obtain images that can be used to more accurately track and analyze the feature of interest in the low-light conditions.

In some implementations, the ROI-enabled sensor may alternate between generating full-resolution sensor data (e.g., images containing each of the ROIs) and ROI sensor data that represent one or more of the ROIs, but not all the ROIs. Thus, in some cases, detection of the feature of interest and selection of the particular ROI may be further based on the full-resolution sensor data in addition to the information about the feature of interest determined based on sensor data from the first sensor. In some cases, capture of the full-resolution sensor data by the ROI-enabled sensor and capture of the sensor data by the first sensor may be synchronized.

In some cases, the full-resolution sensor data and/or the ROI sensor data may include low-light sensor data. For example, the full-resolution images and ROI images generated by an image sensor may be low-light images. Specifically, the plurality of pixels of the image sensor may form a plurality of pixel groups, each made up of two or more neighboring pixels. For example, each pixel group may be a square formed by four adjacent pixels. A low-light image may be generated by binning or combining the signals generated by each of the pixels in a given pixel group, and doing so for each of the pixel groups that make up the image. For example, a low-light full-resolution image may be generated by performing such binning across all the pixel groups of the image sensor. A low-light ROI image may be generated by performing such binning across all the pixel groups of the corresponding ROI. While a resolution of the low-light full-resolution image may be smaller than a maximum resolution of the image sensor, this type of image may nevertheless be referred to as full-resolution in that it includes all of the ROIs of the image sensor.

In some implementations, the pose (i.e., position and orientation) of the ROI-enabled sensor may be fixed with respect to the first sensor and/or the vehicle. In other implementations, the pose of the ROI-enabled sensor may be adjustable with respect to the first sensor and/or the vehicle. Thus, the ROI-enabled sensor may be repositionable with respect to the environment in order to capture the ROI sensor data representing the feature of interest. In both cases, the particular ROI may be selected based on the relative pose of the ROI-enabled sensor with respect to the first sensor and/or the vehicle. Specifically, the particular ROI may be selected based on (i) the position of the feature of interest within the sensor data from the first sensor, (ii) the expected position of the feature of interest at a future time, and/or (iii) the current or future pose of the ROI-enabled sensor with respect to the first sensor and/or the vehicle.

In some embodiments, the first sensor, the ROI-enabled sensor, and the control circuitry may be implemented as a single stand-alone device packed into a single housing and co-located on the vehicle. In other embodiments, the first sensor, the ROI-enabled sensor, and/or the control circuitry may be implemented as multiple separate devices, each having a distinct housing and/or being positioned at a different location on the vehicle.

Analysis of the plurality of ROI sensor data may generate one or more attributes of the feature of interest. These attributes may include geometric properties of the feature of interest, position of the feature of interest within the environment, changes in position of the feature of interest over time (e.g., velocity, acceleration, trajectory), a classification of the feature of interest (e.g., car, pedestrian, vegetation, road, sidewalk, etc.), or one or more confidence values associated with results of the analyzing of the plurality of ROI sensor data (e.g., confidence level that the feature is another car), among other possibilities. The ROI used to generate the ROI sensor data may change over time as new features of interest are detected within different portions of sensor data from the first sensor and/or the full-resolution sensor data captured by the ROI-enabled sensor.

While an image sensor is used herein as an example of an ROI-enabled sensor, LIDAR devices, RADAR devices, thermal cameras, ultrasonic imaging devices, and other types of sensors may also be arranged to provide a plurality of ROIs that can be read out independently of one another. In the case of a LIDAR, for example, LIDAR data may be acquired from a selected ROI by emitting electromagnetic pulses towards some, but not all, portions of the environment along the LIDAR's rotational trajectory. In the case of RADAR, the plurality of ROIs may be defined by a plurality of directional antennas, and ROI RADAR data may be obtained from a selected ROI by using some, but not all, the antennas at a given time. The field of view of an ultrasonic sensor may be similarly divided into ROIs by providing a plurality of directional sound transmitters and microphones, and using a subset thereof at a given time.

Thus, in some implementations, the system may also include a transmitter configured to emit electromagnetic radiation and/or sound within a particular frequency range towards a portion of the environment. The at least one detector of the ROI-enabled sensor may be configured to detect reflections of the electromagnetic radiation and/or sound from the portion of the environment. The information obtained based on sensor data from the first sensor regarding the feature of interest may be used to determine a pose or trajectory for the transmitter, a subset of a plurality of transmitters to be used, and/or a power with which to emit the electromagnetic radiation and/or sound.

The ROI-enabled sensor and at least a portion of the accompanying circuitry may be implemented as layers of an integrated circuit. This integrated circuit may be communicatively connected to a central control system of the autonomous vehicle. In the example of an image sensor, a first layer of the integrated circuit may implement the pixels of the image sensor, a second layer of the integrated circuit may implement image processing circuitry (e.g., high dynamic range (HDR) algorithms, analog-to-digital converters (ADCs), pixel memories, etc.) that is configured to process the signals generated by the pixels, and a third layer of the integrated circuit may implement neural network circuitry that is configured to analyze signals generated by the image processing circuitry in the second layer for object detection, classification, and other attributes.

Accordingly, in some implementations, the generation and analysis of both the full-resolution and ROI sensor data, analysis of the sensor data from the first sensor, and selection of the ROI representing the feature of interest may be performed by this integrated circuit. Once the full-resolution sensor data, the sensor data from the first sensor, and/or the ROI sensor data are processed and the attributes of the feature of interest are determined, the attributes of the feature of interest may be transmitted to the control system of the autonomous vehicle. That is, the full-resolution sensor data, the sensor data from the first sensor, and/or the ROI sensor data might not be transmitted to the control system, thus reducing the amount of bandwidth utilized and necessitated by communication between the integrated circuit and the control system. Notably, in some cases, a portion of the generated sensor data may be transmitted along with the attributes of the object of interest.

In other implementations, the analysis of the full-resolution sensor data, the sensor data from the first sensor, and/or the ROI sensor data, as well as selection of the ROI representing the feature of interest, may be performed by the control system. The control system may thus cause the integrated circuit to generate the ROI sensor data using the selected ROI. While this approach may utilize more bandwidth, it may nevertheless allow the control system to obtain more sensor data (i.e., ROI images) that represent portions of the environment that are of interest, rather than obtaining fewer full-resolution sensor data that represent portions of the environment lacking features of interest.

Further, as the vehicle and the features of interest move through the environment, the features of interest may shift relative to the vehicle. This shift may be observable across multiple sets of sensor data captured over time by a particular sensor. As a given feature shifts, it may eventually move outside of the field of view of the particular sensor and into the field of view of a different sensor on the vehicle. The control system may keep track of this sensor-to-sensor movement of objects. Such tracking may, however, use a large amount of bandwidth and include some delay as sensor data is transferred from the sensors to the control system.

Each sensor may be associated with its own set of values for various sensor parameters (e.g., frequency of emitted electromagnetic radiation, power of the emitted electromagnetic radiation, gain of the detected signal, exposure time, white balance, magnification, etc.). These sensor parameter values may be separately adjustable by the control system for each sensor. For example, the control system may adjust the sensor parameters of a first sensor based on image data captured thereby (e.g., decrease exposure time based on the first sensor facing the sun) so as to improve a quality of subsequently-captured sensor data. However, as the feature of interest moves from the field of view of the first sensor and into the field of view of a second sensor, there may be some delay until the sensor parameters of the first sensor are propagated to the second sensor, or the sensor parameters of the second sensor are otherwise updated, by the control system. Thus, the second sensor may end up capturing some low-quality sensor data (e.g., overexposed images due to facing the sun) before the sensor parameters are adjusted.

Accordingly, in some implementations, the sensors may be configured to communicate with one another directly, by way of a peer-to-peer network, and without involvement by or dependence on the control system. The sensors may share sensor parameter values, expected positions of features of interest, and determined attributes of the features of interest. Thus, once a set of sensor parameter values and/or feature attributes has been determined for a given feature of interest or portion of the environment, this set of sensor parameter values and/or feature attributes may be propagated through to any sensors expected to view that feature or portion of the environment.

This may result in improved sensor data quality and reduced feature tracking latency because each sensor is likely to capture sensor data according to sensor parameter values tailored to a given feature or portion of the environment. That is, a particular sensor might not have to rely on the control system to determine and set the sensor parameter values therefor, but can instead utilize (e.g., directly or with some modification) the sensor parameter values of another sensor that previously viewed the same scene and/or the attributes of the feature of interest detected within that scene. Further, since the sensor might not have to transfer sensor data to the control system and/or to other sensors to obtain sensor parameter values or track features, the bandwidth used by these sensors may also be reduced.

In some implementations, the peer-to-peer network of sensors may include ROI-enabled sensors. An ROI from which an ROI-enabled sensor is to acquire ROI sensor data may be selected based on the expected position of the feature of interest, which may be determined based on sensor data captured by another sensor. For example, a first sensor may indicate to a second ROI-enabled sensor the ROI from which the second sensor is to acquire ROI sensor data. In some implementations, the first sensor may determine which of the other sensors will view the feature of interest at a future time. The first sensor may then transmit the expected position of the feature and the sensor parameter values to the second sensor. This transmission may bypass the control system, although it may pass through one or more other sensors before reaching the second sensor.

Alternatively, the first sensor may broadcast the expected position and the sensor parameters to a plurality of the sensors. The second sensor may then determine whether the broadcasted sensor parameters are intended for the second sensor on the basis of the expected position of the feature with respect to the vehicle and the pose of the second sensor with respect to the vehicle, among other factors.

The plurality of sensors may be interconnected using a plurality of different logical and/or physical network topologies. For example, the sensors may form a point-to-point topology, a ring topology, a mesh topology, a tree topology, a star topology, and/or a shared bus topology. In any one of these topologies, the network of sensors may form a peer-to-peer network operating independently of the control system. That is, the sensors may share information amongst themselves without intervention by the control system. The information may be transmitted to a single sensor (e.g., in the case of a point-to-point connection), or may be broadcast to a plurality of sensors (e.g., when the devices are interconnected by a bus).

Each of the plurality of sensors may include circuitry configured to process the sensor data generated by the sensors. For example, in the case of an image sensor, this circuitry may include image processing circuitry configured to perform image processing operations on image data generated by an image sensor and neural network circuitry configured to analyze an output of the image processing circuitry, among other possibilities. Such processing circuitry may be configured to detect the feature of interest, determine adjustments to the sensor parameters, select an ROI from which to acquire ROI sensor data, determine an expected position of the feature of interest, and/or select another sensor expected to view the feature of interest at a future time, among other operations. In some implementations, the output of the image processing circuitry and/or the output of the neural network circuitry may also be shared amongst the plurality of sensors, thus allowing some of these sensors to avoid performing computations that have been previously been performed by another sensor.

II. Example Vehicle Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100. As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121. Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100. Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100. Camera 130 may be a visible light camera, a thermal camera, a near-infrared (NIR) camera, and/or a short wave infrared (SWIR) camera, among other possibilities.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIGBEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion. In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder/LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object.

The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
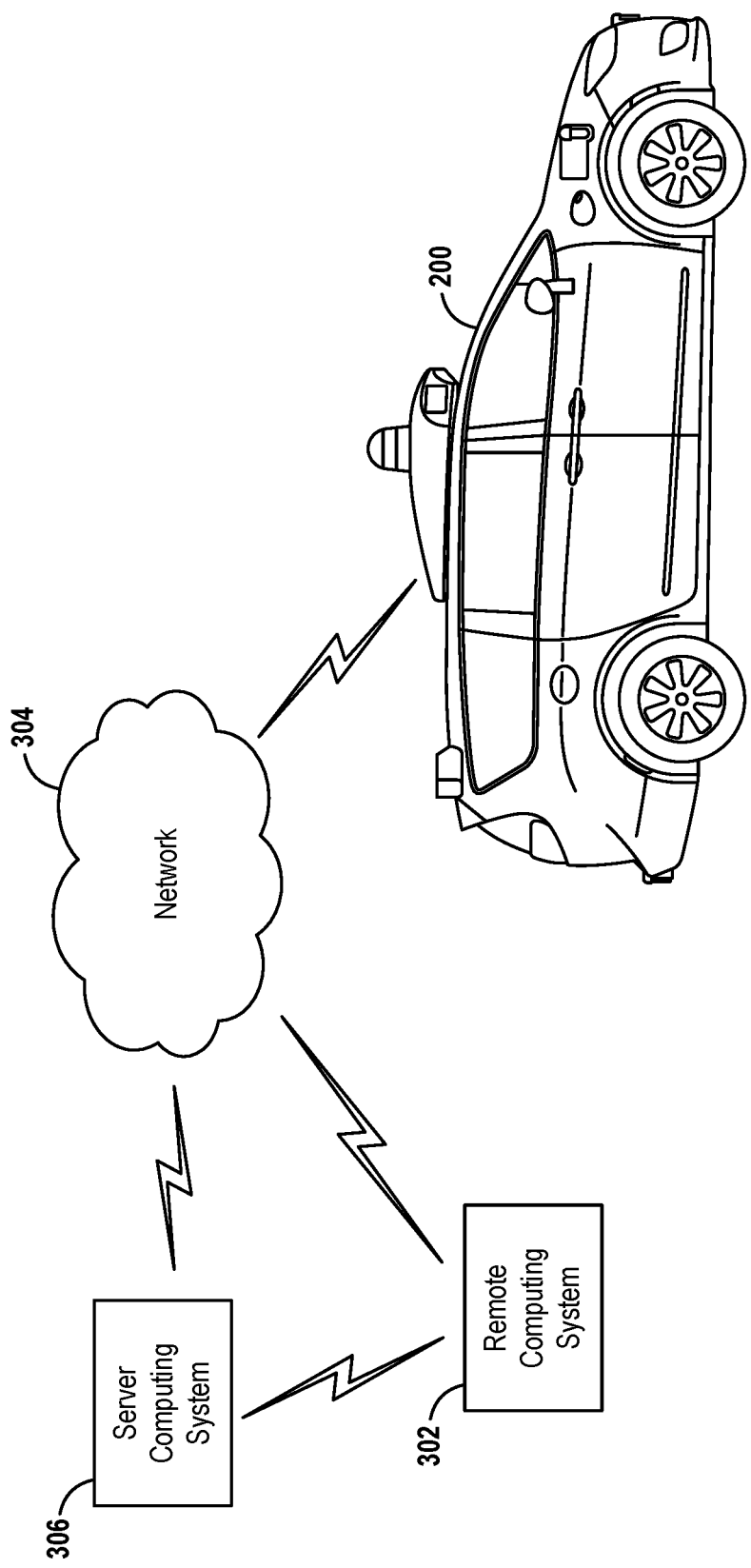
FIG. 3 illustrates wireless communication between various computing systems related to an autonomous vehicle, in accordance with example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation, a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

III. Example Smart Sensor

Figure 4:
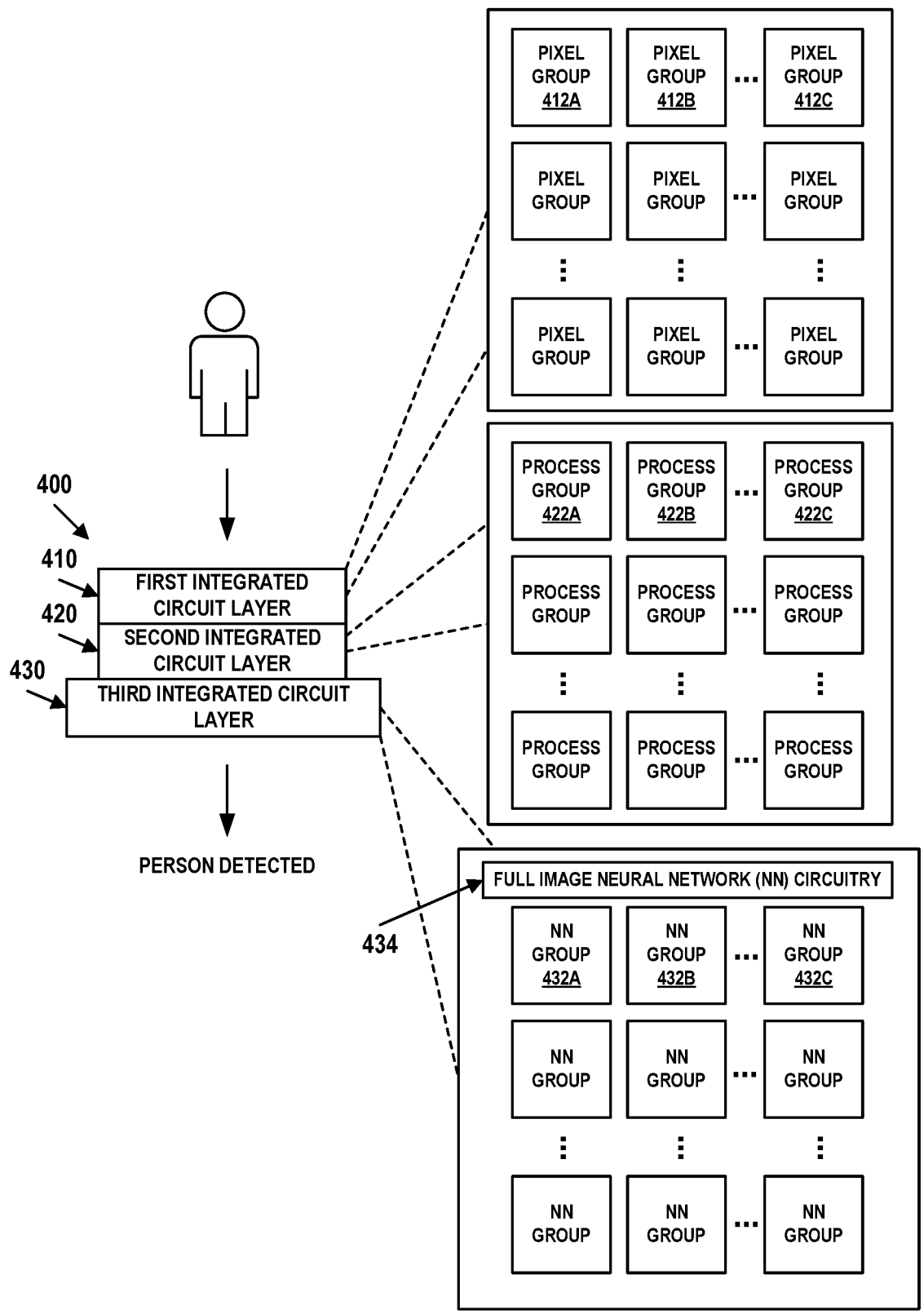
FIG. 4 illustrates a block diagram of an image sensor with three integrated circuit layers, in accordance with example embodiments.

FIG. 4 is a block diagram of an example image sensor 400 with three integrated circuit layers. Image sensor 400 may use the three integrated circuit layers to detect objects. For example, image sensor 400 may capture an image that includes a person and output an indication of "person detected." In another example, image sensor 400 may capture an image and output a portion of the image that includes a vehicle that was detected by image sensor 400.

The three integrated circuit layers includes a first integrated circuit layer 410, a second integrated circuit layer 420, and a third integrated circuit layer 430. First integrated circuit layer 410 is stacked on second integrated circuit layer 420, and second integrated circuit layer 420 is stacked on third integrated circuit layer 430. First integrated circuit layer 410 may be in electrical communication with second integrated circuit layer 420. For example, first integrated circuit layer 410 and second integrated circuit layer 420 may be physically connected to one another with interconnects. Second integrated circuit layer 420 may be in electrical communication with third integrated circuit layer 430. For example, second integrated circuit layer 420 and third integrated circuit layer 430 may be physically connected to one another with interconnects.

First integrated circuit layer 410 may have a same area as second integrated circuit layer 420. For example, the length and width of first integrated circuit layer 410 and second integrated circuit layer 420 may be the same while the heights may be different. Third integrated circuit layer 430 may have a larger area than first and second integrated circuit layers 410, 420. For example, third integrated circuit layer 430 may have a length and width that are both twenty percent greater than the length and the width of first and second integrated circuit layers 410, 420.

First integrated circuit layer 410 may include an array of pixel sensors that are grouped by position into pixel sensor groups (each pixel sensor group referred to as "pixel group" in FIG. 4) 412A-412C (collectively referred to by 412). For example, first integrated circuit layer 410 may include a 6400×4800 array of pixel sensors grouped into three hundred twenty by two hundred forty pixel sensor groups, where each pixel sensor group includes an array of 20×20 pixel sensors. Pixel sensor groups 412 may be further grouped to define ROIs. Each of pixel sensor groups 412 may include 2×2 pixel sensor sub-groups. For example, each of the pixel sensor groups of 20×20 pixel sensors may include ten by ten pixel sensor sub-groups, where each pixel sensor sub-group includes a red pixel sensor in an upper left, a green pixel sensor in a lower right, a first clear pixel sensor in a lower left, and a second clear pixel sensor in an upper right, each sub-group also referred to as Red-Clear-Clear-Green (RCCG) sub-groups.

In some implementations, the size of the pixel sensor groups may be selected to increase silicon utilization. For example, the size of the pixel sensor groups may be such that more of the silicon is covered by pixel sensor groups with the same pattern of pixel sensors.

Second integrated circuit layer 420 may include (pixel-level) image processing circuitry groups (each image processing circuitry group referred to as "process group" in FIG. 4) 422A-422C (collectively referred to by 422). For example, second integrated circuit layer 420 may include three hundred twenty by two hundred forty image processing circuitry groups. Image processing circuitry groups 422 may be configured to each receive pixel information from a corresponding pixel sensor group and further configured to perform image processing operations on the pixel information to provide processed pixel information during operation of image sensor 400.

In some implementations, each image processing circuitry group 422 may receive pixel information from a single corresponding pixel sensor group 412. For example, image processing circuitry group 422A may receive pixel information from pixel sensor group 412A and not from any other pixel group, and image processing circuitry group 422B may receive pixel information from pixel sensor group 412B and not from any other pixel group.

In some implementations, each image processing circuitry group 422 may receive pixel information from multiple corresponding pixel sensor groups 412. For example, image processing circuitry group 422A may receive pixel information from both pixel sensor groups 412A and 412B and no other pixel groups, and image processing circuitry group 422B may receive pixel information from pixel group 412C and another pixel group, and no other pixel groups.

Having image processing circuitry groups 422 receive pixel information from corresponding pixel groups may result in fast transfer of the pixel information from first integrated circuit layer 410 to second layer 420 as image processing circuitry groups 422 may physically be close to the corresponding pixel sensor groups 412. The longer the distance over which information is transferred, the longer the transfer may take. For example, pixel sensor group 412A may be directly above image processing circuitry group 422A and pixel sensor group 412A may not be directly above the image processing circuitry group 422C, so transferring pixel information from pixel sensor group 412A to the image processing circuitry group 422A may be faster than transferring pixel information from the pixel sensor group 412A to image processing circuitry group 422C, if there were interconnects between pixel sensor group 412A and image processing circuitry group 422C.

Image processing circuitry groups 422 may be configured to perform image processing operations on pixel information that image processing circuitry groups 422 receives from the pixel groups. For example, image processing circuitry group 422A may perform high dynamic range fusion on pixel information from pixel sensor group 412A and image processing circuitry group 422B may perform high dynamic range fusion on pixel information from pixel sensor group 412B. Other image processing operations may include, for example, analog to digital signal conversion and demosaicing.

Having image processing circuitry groups 422 perform image processing operations on pixel information from corresponding pixel sensor groups 412 may enable image processing operations to be performed in a distributed fashion in parallel by image processing circuitry groups 422. For example, image processing circuitry group 422A may perform image processing operations on pixel information from pixel sensor group 412A at the same time as image processing circuitry group 422B performs image processing operations on pixel information from pixel group 422B.

Third integrated circuit layer 430 may include neural network circuitry groups 432A-432C (each neural network circuitry group referred to as "NN group" in FIG. 4) 432A-432C (collectively referred to by 432) and full image neural network circuitry 434. For example, third integrated circuit layer 430 may include three hundred twenty by two hundred forty neural network circuitry groups.

Neural network circuitry groups 432 may be configured to each receive processed pixel information from a corresponding image processing circuitry group and further configured to perform analysis for object detection on the processed pixel information during operation of image sensor 400. In some implementations, neural network circuitry groups 432 may each implement a convolutional neural network (CNN).

In some implementations, each neural network circuitry group 432 may receive processed pixel information from a single corresponding image processing circuitry group 422. For example, neural network circuitry group 432A may receive processed pixel information from image processing circuitry group 422A and not from any other image processing circuitry group, and neural network circuitry group 432B may receive processed pixel information from image processing circuitry group 422B and not from any other image processing circuitry group.

In some implementations, each neural network circuitry group 432 may receive processed pixel information from multiple corresponding image processing circuitry groups 422. For example, neural network circuitry group 432A may receive processed pixel information from both image processing circuitry groups 422A and 422B and no other image processing circuitry groups, and neural network circuitry group 432B may receive processed pixel information from both image processing circuitry group 422C and another pixel group, and no other pixel groups.

Having the neural network circuitry groups 432 receive processed pixel information from corresponding image processing circuitry groups may result in fast transfer of the processed pixel information from second integrated circuit layer 420 to third integrated circuit layer 430 as neural network circuitry groups 432 may physically be close to the corresponding image processing circuitry groups 422. Again, the longer the distance over which information is transferred, the longer the transfer may take. For example, image processing circuitry group 422A may be directly above neural network circuitry group 432A so transferring processed pixel information from image processing circuitry group 422A to neural network circuitry group 432A may be faster than transferring processed pixel information from image processing circuitry group 422A to neural network circuitry group 432C, if there were interconnects between image processing circuitry group 422A and neural network circuitry group 432C.

Neural network circuitry groups 432 may be configured to detect objects from the processed pixel information that neural network circuitry groups 432 receive from image processing circuitry groups 422. For example, neural network circuitry group 432A may detect objects from the processed pixel information from image processing circuitry group 422A, and neural network circuitry group 432B may detect objects from the processed pixel information from image processing circuitry group 422B.

Having neural network circuitry groups 432 detect objects from the processed pixel information from corresponding image processing circuitry group 422 enables detection to be performed in a distributed fashion in parallel by each of neural network circuitry groups 432. For example, neural network circuitry group 432A may detect objects from processed pixel information from image processing circuitry group 422A at the same time as neural network circuitry group 432B may detect objects from processed pixel information from image processing circuitry group 422B.

In some implementations, neural network circuitry groups 432 may perform intermediate processing. Accordingly, image sensor 400 may use the three integrated circuit layers 410, 420, and 430 to perform some intermediate processing and output just an intermediate result. For example, image sensor 400 may capture an image that includes a person and output an indication of "area of interest in some region of the image," without classifying the object of interest (the person). Other processing, performed outside image sensor 400 may classify the region of interest as a person.

Accordingly, the output from image sensor 400 may include some data representing the output of some convolutional neural network. This data in itself may be hard to decipher, but once it continues to be processed outside image sensor 400, the data may be used to classify the region as including a person. This hybrid approach may have an advantage of reducing required bandwidth. Accordingly, output from neural network circuitry groups 432 may include one or more of selected regions of interest for pixels representing detections, metadata containing temporal and geometrical location information, intermediate computational results prior to object detection, statistical information regarding network certainty level, and classifications of detected objects.

In some implementations, neural network circuitry groups 432 may be configured to implement CNNs with high recall and low precisions. Neural network circuitry groups 432 may each output a list of objects detected, where the object was detected, and timing of detection of the object.

Full image neural network circuitry 434 may be configured to receive, from each of neural network circuitry groups 432, data that indicates objects that neural network circuitry groups 432 detected and detect objects from the data. For example, neural network circuitry groups 432 may be unable to detect objects that are captured by multiple pixel groups, as each individual neural network circuitry group may only receive a portion of processed pixel information corresponding to the object. But, full image neural network circuitry 434 may receive data from multiple neural network circuitry groups 432 and may thus be able to detect objects sensed by multiple pixel groups. In some implementations, full image neural network circuitry 434 may implement a recurrent neural network (RNN). The neural networks may be configurable, both in regard to their architecture (number and type of layers, activation functions, etc.) as well as in regard to the actual values of neural network components (e.g. weights, biases, etc.)

In some implementations, having image sensor 400 perform processing may simplify a processing pipeline architecture, provide higher bandwidth and lower latency, allow for selective frame rate operations, reduce costs with the stacked architecture, provide higher system reliability as an integrated circuit may have fewer potential points of failure, and provide significant cost and power savings on computational resources.

The layered structure of image sensor 400 may also be applied to other types of sensors. For example, in the case of RADAR, pixel groups 412 may be replaced with antennas. Process groups 422 and NN groups 432 may thus be configured to process the signals detected by the antennas, rather than by pixels. Thus, while the specific implementation of the detectors (e.g., the particular frequency of electromagnetic radiation detected thereby) utilized by the sensor may vary, the sensor may nevertheless be organized into multiple layers, with processing circuitry in one layer being used to process the signals generated by co-located detectors in another layer.

IV. Example ROI Arrangement

Figure 5:
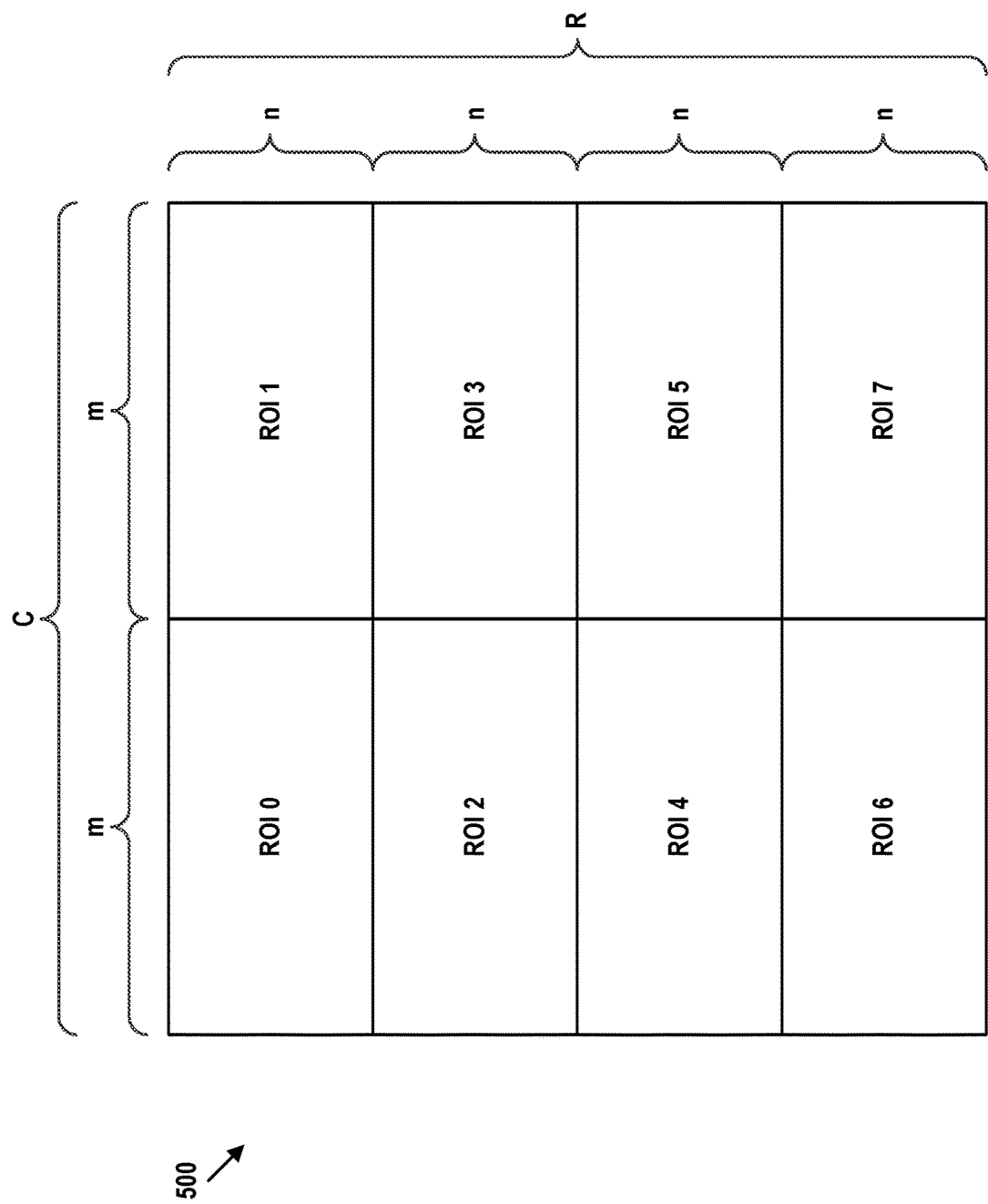
FIG. 5 illustrates an arrangement of regions of interest, in accordance with example embodiments.

FIG. 5 illustrates an example arrangement of ROIs on an image sensor. Namely, image sensor 500 may include pixels forming C columns and R rows. Image sensor 500 may be analogous to image sensor 400. Thus, the pixels of image sensor 500 may correspond to first integrated circuit layer 410. Image sensor may be divided into eight ROIs, including ROI 0, ROI 1, ROI 2, ROI 3, ROI 4, ROI 5, ROI 6, and ROI 7 (i.e., ROIs 0-7), each of which comprises m columns of pixels and n rows of pixels. Thus, C=2m and R=4n. In some implementations, each ROI may include therein multiple pixel groups 412. Alternatively, pixel groups 412 may be sized and arranged such that each pixel group is also an ROI.

FIG. 5 illustrates the ROIs arranged into two columns, with even-numbered ROIs on the left and odd-numbered ROIs on the right. In other implementations, however, the ROIs and their numbering may be arranged in different ways. For example, ROIs 0-3 may be in the left column while ROIs 4-7 may be in the right column. In another example, the ROIs may divide image sensor 500 into 8 columns organized into a single row, with the ROIs numbered from 0-7 arranged from left to right along the 8 columns of the single row. In some implementations, the ROIs may be fixed in a given arrangement. Alternatively, the ROIs may be reconfigurable. Namely, the number of ROIs, position of each ROI, and the shape of each ROI may be reconfigurable.

Image data may be read-out from a given ROI of ROIs 0-7 independently of the other ROIs. For example, image data may be acquired from ROI 0 without also acquiring image data from the other ROIs. In another example, ROI image data may be read out from two or more different ROIs in parallel (e.g., from ROI 2 and ROI 7). Image data generated by a union of ROIs 0-7 may be referred to as a full-resolution image, while image data that includes a subset of ROIs 0-7 may be referred to as an ROI image.

Image sensor 500 may include a combination of analog-to-digital converters (ADCs), multiplexers, and read-out transistors that allows for independent readout of each of ROIs 0-7. ROI image data may be read out from a given ROI column by column or row by row, depending on the arrangement of the read-out circuitry. For example, when ROI 2 is to be read out, read-out circuitry may be reassigned from ROIs 0, 4, and 6 to read out 4 columns of ROI 2 in parallel. In another example, read-out circuitry may be reassigned from ROIs 0, 1, and 3-7 to ROI 2 to read out 8 columns of ROI 2 in parallel. Thus, the rate at which a given ROI may be read-out may depend on the amount of image read-out circuitry that is reassignable to between the ROIs.

The full-resolution image and/or one or more ROI images may be used to select one or more ROIs from which ROI images are to be acquired. For example, the full-resolution images may be analyzed to detect therein an object of interest. An ROI that contains or is expected to contain the object of interest may be selected to be used to generate a plurality of ROI images for further analysis. An object may be considered to be of interest based on, for example, a speed of the object (e.g., when this speed exceeds a threshold speed or is below the threshold speed) a distance between image sensor 400 and the object (e.g., when this distance exceeds a threshold distance is below the threshold distance), and/or a classification of the object, among other possibilities.

In some implementations, selection of the ROI may be performed by third integrated circuit layer 430 of image sensor 400. For example, full image NN circuitry 434 may be used to select the ROI. In other implementations, the ROI may be selected by a control system (e.g., a control system of an autonomous vehicle) that is communicatively connected to and operates based on the outputs of image sensor 400. Once a particular ROI is selected, the particular ROI may be used to acquire a plurality of ROI images.

V. Example ROI Selection Based on Radiometric Images

Figure 6A:
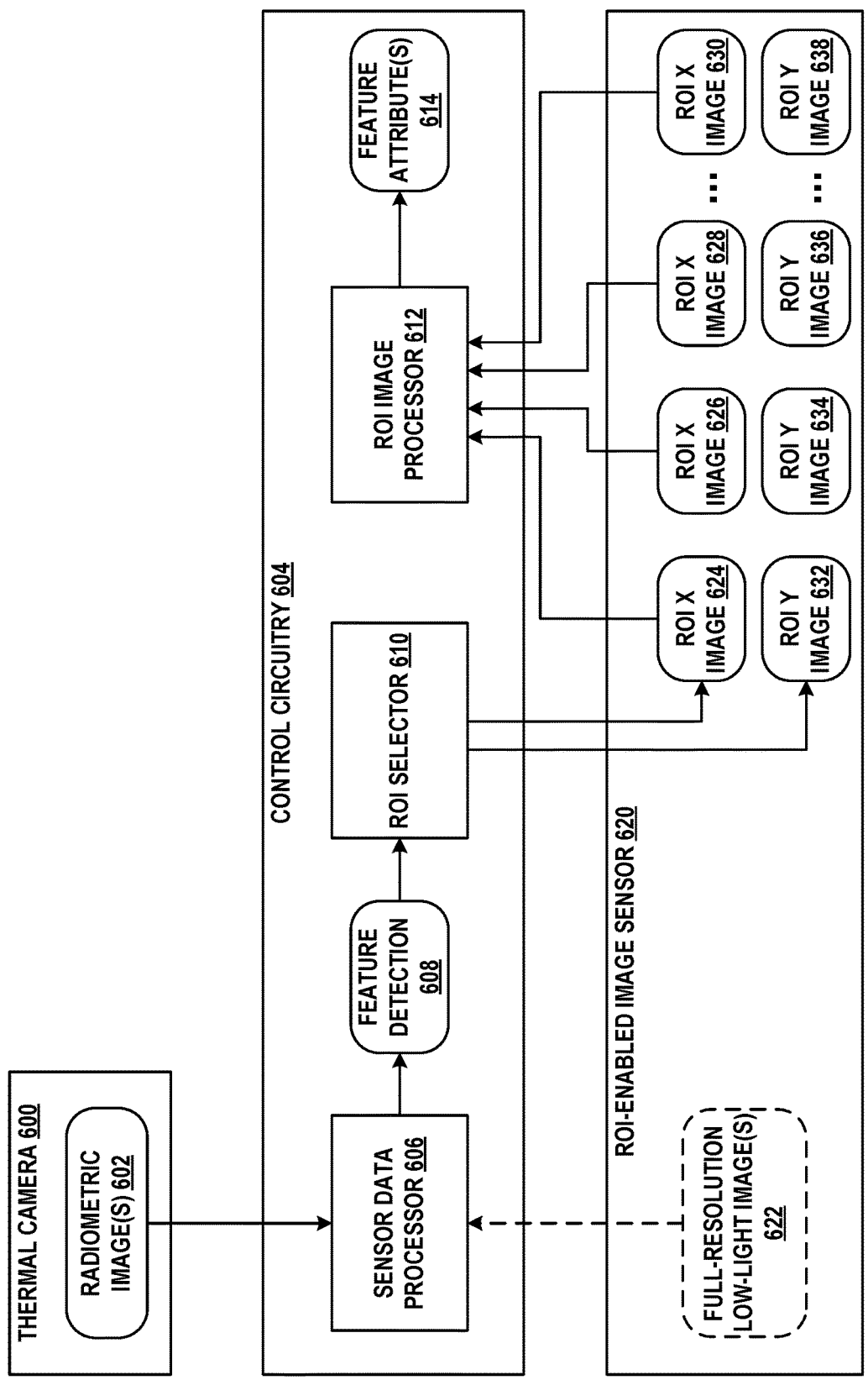
FIGS. 6A and 6B illustrate selection of a region of interest, in accordance with example embodiments

FIG. 6A illustrates an example sensor arrangement in which sensor data from a first sensor of a first type is used to select an ROI for a second sensor of a second type different from the first type. Specifically, FIG. 6A includes thermal camera 600, ROI-enabled image sensor ("image sensor") 620, and control circuitry 604. In some implementations, each of thermal camera 600, control circuitry 604 and image sensor 620 may be disposed on a vehicle or robotic device to be used to facilitate navigation and/or operation of the vehicle or robotic device. Control circuitry 604 may represent hardware and/or software components configured to perform the operations discussed herein, and may include aspects of control system 106, computer system 112, process groups 422, NN groups 432, and/or full image NN circuitry 434, among other components.

Thermal camera 600 may be configured to generate radiometric image(s) 602. Radiometric image(s) 602 may include one or more images that represent the infrared radiation (e.g., radiation having wavelengths between 700 and 14,000 nanometers) emitted by objects within an environment. Thus, radiometric image(s) 602 may be indicative of heat signatures within the environment, and may be used to detect humans, animals, and other heat-generating objects.

ROI-enabled image sensor 620 may be an image sensor having a field of view divided into a plurality of ROIs, such as, for example, image sensor 500. However, ROI-enabled image sensor 620 may alternatively represent any other type of sensor (e.g., RADAR, LIDAR, ultrasonic, another thermal camera, etc.) having a field of view that includes two or more ROIs that can be read-out independently of one another. In some implementations, image sensor 620 may be configured to generate full-resolution images that include each of the ROIs of the image sensor. In some cases, these full-resolution images may be full-resolution low-light image(s) 622. Full-resolution low-light image(s) 622 may include images generated by binning two or more adjacent pixels of image sensor 620 to generate a signal with a higher signal-to-noise ratio, thus generating an image that improves the detectability of environmental features in low-light conditions.

Control circuitry 604 may include sensor data processor 606 which may be configured to receive as input and process radiometric image(s) 602. Sensor data processor 606 may be configured to generate as output, based on radiometric image(s) 602, feature detection 608. In some cases, sensor data processor 606 may generate feature detection 608 further based on full-resolution low-light image(s) 622 or another form of full-resolution sensor data from ROI-enabled image sensor 620. Using both radiometric image(s) 602 and full-resolution low-light image(s) 622 may facilitate detection of features of interest and determination of properties thereof in low-light conditions. For example, radiometric image(s) 602 may include information that is lacking in low-light image(s) 622, and vice versa, thus allowing for determination of a greater range of properties of the feature of interest, and/or allowing for this determination to be more accurate.

Feature detection 608 may include information about one or more properties, attributes, or characteristics of the feature of interest detected within the environment. In one example, sensor data processor 606 may be configured to identify portions of radiometric image(s) 602, and thus of the environment (and/or full-resolution low-light image(s) 622), that contain heat-generating objects. Accordingly, feature detection 608 may indicate a position of the feature of interest within radiometric image(s) 602, full-resolution low-light image(s) 622, and/or within the environment. In another example, sensor data processor 606 may be configured to additionally classify the feature of interest (e.g., as a human, dog, cat, another car, etc.), determine its temperature, expected trajectory, and/or other attributes, each of which may be represented by feature detection 608.

Control circuitry 604 may also include ROI selector 610 configured to receive as input feature detection 608 and, based thereon, select a particular ROI of ROI-enabled image sensor 620 from which to acquire ROI image data. The ROI image data may be obtained by image sensor 620 instead of obtaining additional full-resolution image data. For example, the ROI image data may be obtained at a higher frame rate than the additional full-resolution image data would otherwise be obtained, thus allowing the feature of interest to be observed in more detail. In the example illustrated in FIG. 6A, ROI selector 610 selects ROI X and ROI Y as the two ROIs of image sensor 620 from which to obtain ROI image data. X and Y represent variables and, in the example of image sensor 500, may have values ranging from 0 to 7.

The ROI selection made by ROI selector 610 may be communicated by control circuitry 604 to image sensor 620, which may obtain a plurality of ROI images in response to reception of this ROI selection. Thus, image sensor 620 may obtain ROI images 624, 626, and 628 through 630 (i.e., ROI images 624-630) from ROI X and ROI images 632, 634, and 636 through 638 (i.e., ROI images 632-638) from ROI Y. In some cases, ROI images 624-630 and 632-638 may be low-light ROI images generated by binning two or more adjacent pixels. Such low-light ROI images may facilitate analysis of aspects of the feature of interest in low-light conditions.

Each of ROI images 624-630 and 632-638 may be processed by ROI image processor 612 provided by control circuitry 604. ROI image processor 612 may be configured to generate as output feature attribute(s) 614. Feature attribute(s) 614 may include any properties, characteristics, or information associated with the feature(s) represented in ROI images 624-630 and 632-638. For example, feature attributes(s) 614 may include a current or expected position, speed, or acceleration, and/or a classification of the feature of interest. In some cases, feature attribute(s) 614 may include more attributes than are indicated by feature detection 608, or may be more accurate than the attributes indicated by feature detection 608. Specifically, such determination of additional attributes and/or a more accurate calculation of the attributes may be enabled by the increased amount of sensor data that focuses on the feature of interest.

Feature attribute(s) 614 may be used as a basis for determining the operations to be executed by the vehicle or robotic device that utilizes thermal camera 600 and image sensor 620. Feature attribute(s) 614 may additionally be used to select a portion of the environment to be imaged by thermal camera 600 and/or image sensor 620, and/or select one or more ROIs from which to obtain additional ROI image data. Thus, the process discussed with respect to FIG. 6A may be repeated, with new ROIs being selected over time based on additional radiometric image(s), additional full-resolution low-light image(s), and/or feature attribute(s) 614.

In some implementations, control circuitry 604 may be physically separate from thermal camera 600 and/or image sensor 620. In other implementations, portions or subsets of control circuitry 604 may be provided as part of or integrated with thermal camera 600 and/or image sensor 620. For example, sensor data processor 606 and ROI selector 610 might be integrated with thermal camera 600, while ROI image processor 612 may be integrated with image sensor 620. Further, in some implementations, each of thermal camera 600, control circuitry 604, and image sensor 620 may be co-located within a single sensor housing or package.

VI. Example ROI Selection Based on LIDAR Data

Figure 6B:
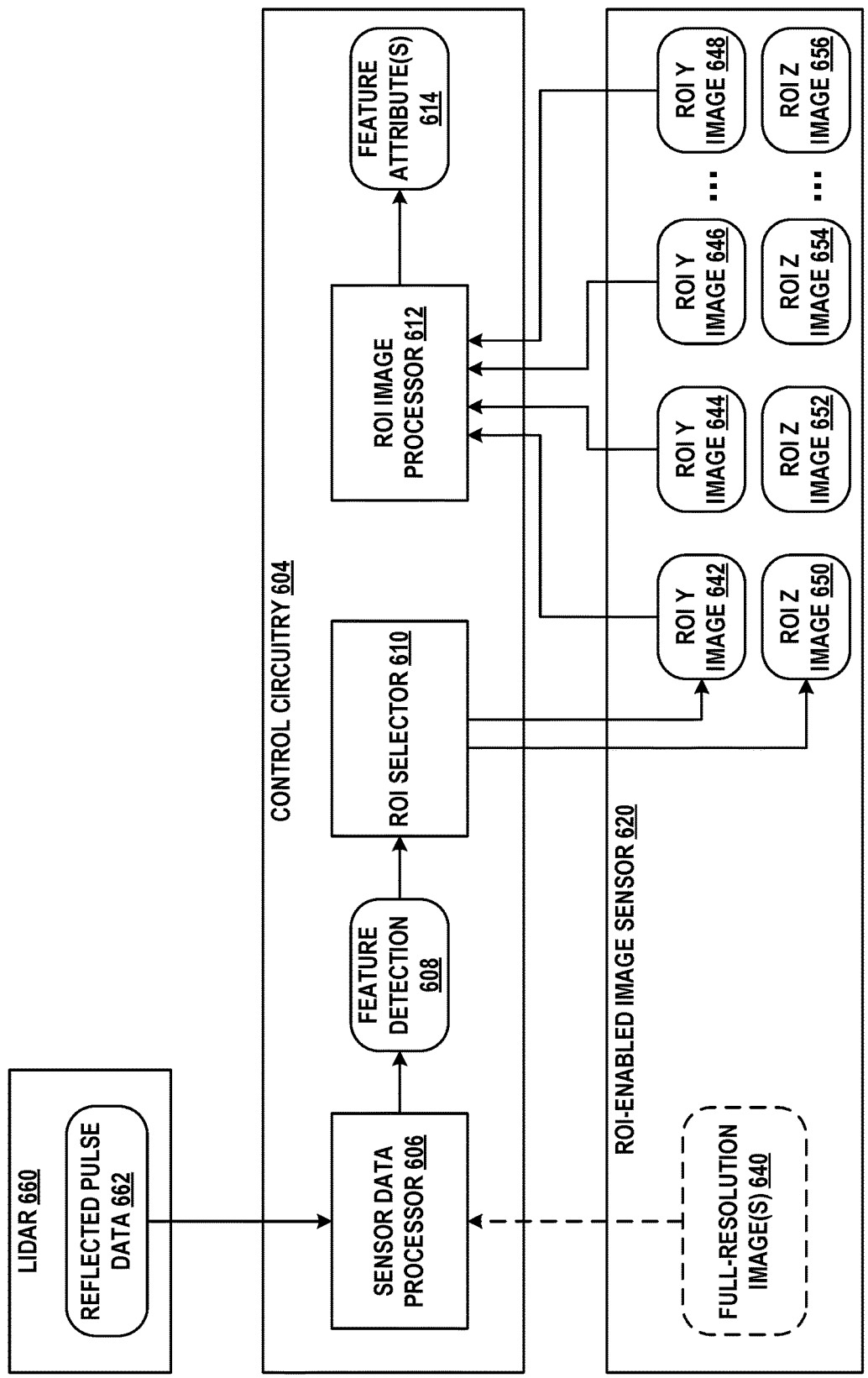

FIG. 6B illustrates another example sensor arrangement in which sensor data from a LIDAR device is used to select an ROI for an image sensor. Specifically, LIDAR 660 may be configured to generate reflected pulse data 662 based on which sensor data processor 606 may be configured to select one or more ROIs of image sensor 620 from which to obtain ROI image data. Reflected pulse data 662 may include information associated with the physical properties of a point in the environment from which the pulse was reflected. For example, reflected pulse data 662 may indicate a range, speed, and/or reflectivity of the point, among other physical properties.

Reflected pulse data 662 may be aggregated by LIDAR 660 and/or sensor data processor 606 into a point cloud. Thus, in some implementations, feature detection 608 may be based on a representation of the feature within the pointcloud. In some cases, sensor data processor 606 may generate feature detection 608 further based on full-resolution image(s) 640 or another form of full-resolution sensor data from ROI-enabled image sensor 620.

Using reflected pulse data 662 to select the particular ROI for image sensor 620 may also allow for selection of various sensor parameters for the particular ROI. For example, reflected pulse data 662 may indicate a reflectivity of the feature of interest, thus allowing a gain or exposure time of image sensor 620 to be adjusted to values that improve the quality of the ROI images. In another example, reflected pulse data 662 may indicate a range and speed of the feature of interest, thus allowing a zoom level and/or frame rate of image sensor 620 to be adjusted to values that allow the feature of interest to be represented in the ROI images with a desired level of detail. The values of the sensor parameters may be selected by ROI selector 610 or another module of control circuitry 604 not shown in FIG. 6B.

As discussed with respect to FIG. 6A, feature detection 608 illustrated in FIG. 6B may likewise include information about one or more properties, attributes, or characteristics of the feature of interest, including a position of the feature of interest within the point cloud, within full-resolution image(s) 640, and/or within the environment, a classification of the feature of interest, an expected trajectory of the feature of interest, and/or other attributes. ROI selector 610 may be configured to select a particular ROI of ROI-enabled image sensor 620 based on feature detection 608. In the example illustrated in FIG. 6B, ROI selector 610 selects ROI Y and ROI Z as the two ROIs of image sensor 620 from which to obtain ROI image data, where Y and Z represent variables (e.g., ranging from 0 to 7 in the case of image sensor 500).

Image sensor 620 may obtain ROI images 642, 644, and 646 through 648 (i.e., ROI images 642-648) from ROI Y and ROI images 650, 652, and 654 through 656 (i.e., ROI images 650-656) from ROI Z. In some cases, ROI images 642-648 and 650-656 may be low-light ROI images. Each of ROI images 642-648 and 650-656 may be processed by ROI image processor 612 to generate as output feature attribute(s) 614. Such operations may be repeated over time based on additional reflected pulse data, additional full-resolution image(s), and/or the ROI images to select other ROIs that focus on other features of interest.

As mentioned above, the ROI-enabled sensor may be of a different type than shown in FIGS. 6A and 6B. For example, the ROI-enabled sensor may be another LIDAR sensor or a RADAR sensor. Thus, in some cases, the ROI-enabled sensor may include a transmitter configured to emit electromagnetic radiation towards the environment. For example, a RADAR sensor may include one or more antennas, while a LIDAR sensor may include one or more laser sources. The power with which this transmitter emits the electromagnetic radiation is another sensor parameter that may be controllable based on data from the first sensor of the first type (e.g., thermal camera 600, LIDAR 660, etc.).

For example, based on reflected pulse data 662, control circuitry 604 may determine an expected reflectivity of the electromagnetic radiation emitted by the transmitter from the feature of interest. In cases where the electromagnetic radiation is of a different frequency than that used by LIDAR 660, control circuitry 604 may be configured to account for potential differences in reflectivity due to this difference in frequency. Control circuitry 604 may be further configured to adjust the power of the transmitter based on the expected reflectivity of the feature of interest with respect to the emitted electromagnetic radiation. Thus, for example, low-reflectivity features of interest may be imaged with a desired accuracy during the first round of imaging by the ROI-enabled sensor, without having to perform additional rounds of imaging at higher power.

VII. Example Peer-to-Peer Sensor Architecture

Figure 7:
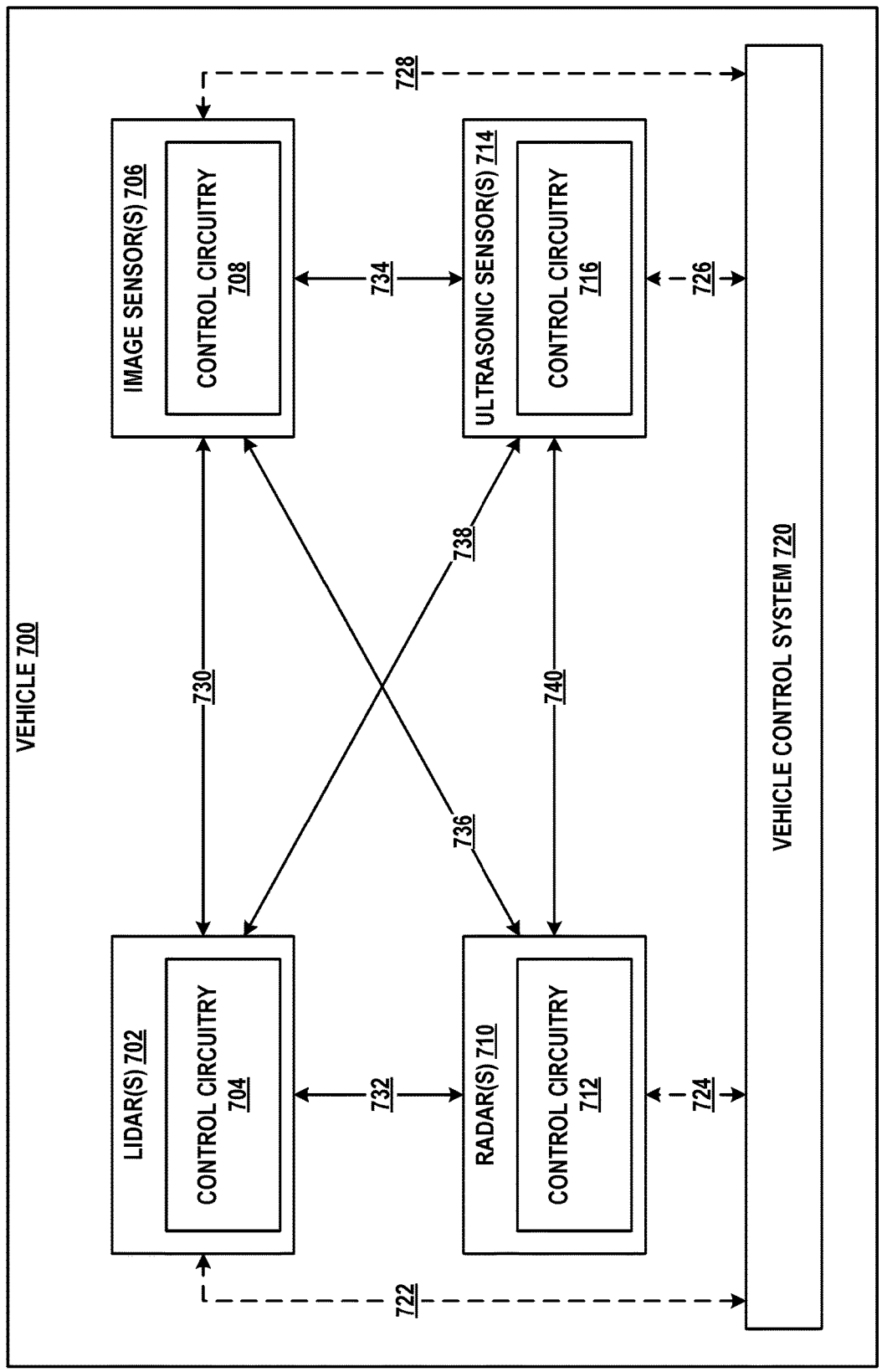
FIG. 7 illustrates peer-to-peer connections between sensors, in accordance with example embodiments.

FIG. 7 illustrates an example sensor architecture in which various types of sensors are configured to share one or more of ROI information, attributes of detected features of interest, and/or sensor parameters with one another via a peer-to-peer network. In some cases, such sharing by way of the peer-to-peer network may be performed independently and/or without involvement of a central control system. Specifically, FIG. 7 includes vehicle 700, which may represent an autonomous vehicle (e.g., vehicle 100 or 200) or a robotic device, among other possibilities. Vehicle 700 may include vehicle control system 720, LIDAR(s) 702, RADAR(s) 710, image sensor(s) 706, and ultrasonic sensor(s) 714.

Vehicle control system 720 may represent hardware and/or software configured to control operations of vehicle 700 based on data from LIDAR(s) 702, RADAR(s) 710, image sensor(s) 706, and ultrasonic sensor(s) 714. Thus, vehicle control system 720 may be communicatively connected to LIDAR(s) 702 by way of connection 722, to RADAR(s) 710 by way of connection 724, to image sensor(s) 706 by way of connection 728, and to ultrasonic sensor(s) 714 by way of connection 726. Each of LIDAR(s) 702, RADAR(s) 710, image sensor(s) 706, and/or ultrasonic sensor(s) 714 may include corresponding control circuitry 704, 712, 708, and 716, respectively, configured to process sensor data from the corresponding sensor and handle communications with vehicle control system 720 and the other sensors. In some implementations, control circuitry 704, 712, 708, and 716 may be implemented as one or more layers of a respective integrated circuit that forms the respective sensor (e.g., as shown in FIG. 4).

Further, each of LIDAR(s) 702, RADAR(s) 710, image sensor(s) 706, and/or ultrasonic sensor(s) 714 may be interconnected with one another by way of a peer-to-peer network of connections. Specifically, LIDAR(s) 702 may be communicatively connected to RADAR(s) 710 by way of peer-to-peer connection 732, to image sensor(s) 706 by way of peer-to-peer connection 730, and to ultrasonic sensor(s) 714 by way of peer-to-peer connection 738. Similarly, RADAR(s) 710 may be communicatively connected to image sensor(s) 706 by way of peer-to-peer connection 736 and to ultrasonic sensor(s) 714 by way of peer-to-peer connection 740. Further, image sensor(s) 706 may be communicatively connected to ultrasonic sensor(s) 714 by way of peer-to-peer connection 734.

When each type of sensor includes two or more such sensors, each of the sensors of the first type may be connected to each of the sensors of the second type. Thus, for example, connection 732 may represent multiple peer-to-peer connections between multiple LIDAR devices and multiple RADAR devices. Although FIG. 7 illustrates a peer-to-peer network having a mesh topology, other peer-to-peer topologies may be implemented in alternative embodiments. For example, LIDAR(s) 702, RADAR(s) 710, image sensor(s) 706, and ultrasonic sensor(s) 714 may be interconnected according to a star topology, a bus topology, a ring topology, or a combination thereof.

Regardless of the specific topology, each of LIDAR(s) 702, RADAR(s) 710, image sensor(s) 706, and/or ultrasonic sensor(s) 714 may be configured to communicate with one another independently of vehicle control system 720. That is, for example, a communication between ultrasonic sensor(s) 714 and LIDAR(s) 702 may be transmitted by way of connection 738, without moving through or reaching vehicle control system 720. Accordingly, LIDAR(s) 702, RADAR(s) 710, image sensor(s) 706, and/or ultrasonic sensor(s) 714 may share ROI information, determined attributes of features of interest, and/or sensor parameter values with one another without involvement by vehicle control system 720.

Such direct, peer-to-peer communication among sensors of different types may allow these sensors to quickly react to changes in the environment and capture high-quality sensor data that is useful for determining how to operate vehicle 700. By avoiding communicating by way of vehicle control system 720, the transmission path of the information may be shortened, thus reducing communication delay. Further, by selecting the ROI, determining the attributes of a feature of interest, and/or determining the sensor parameter values using control circuitry 704, 708, 712, and/or 716, the speed with which the ROI is selected and sensor parameter values are updated may be independent of the processing load on vehicle control system, thereby further reducing the delay.

Although LIDAR(s) 702, RADAR(s) 710, image sensor(s) 706, and/or ultrasonic sensor(s) 714 may be configured to communicate directly with one another to directly share certain information, these sensors may also share information with vehicle control system 720. For example, each sensor may share with vehicle control system 720 the results of various sensor data processing operations executed on the captured sensor data, along with at least portions of the sensor data itself. In general, sensors 702, 706, 710, and 714 may share with vehicle control system 720 information useful in operating vehicle 700, and may share directly with one another information regarding where and how to capture sensor data. Thus, the peer-to-peer sensor network may allow vehicle 700 to avoid using vehicle control system 720 as a communication intermediary for communication of a certain type between sensors 702, 706, 710, and 714.

Figure 8:
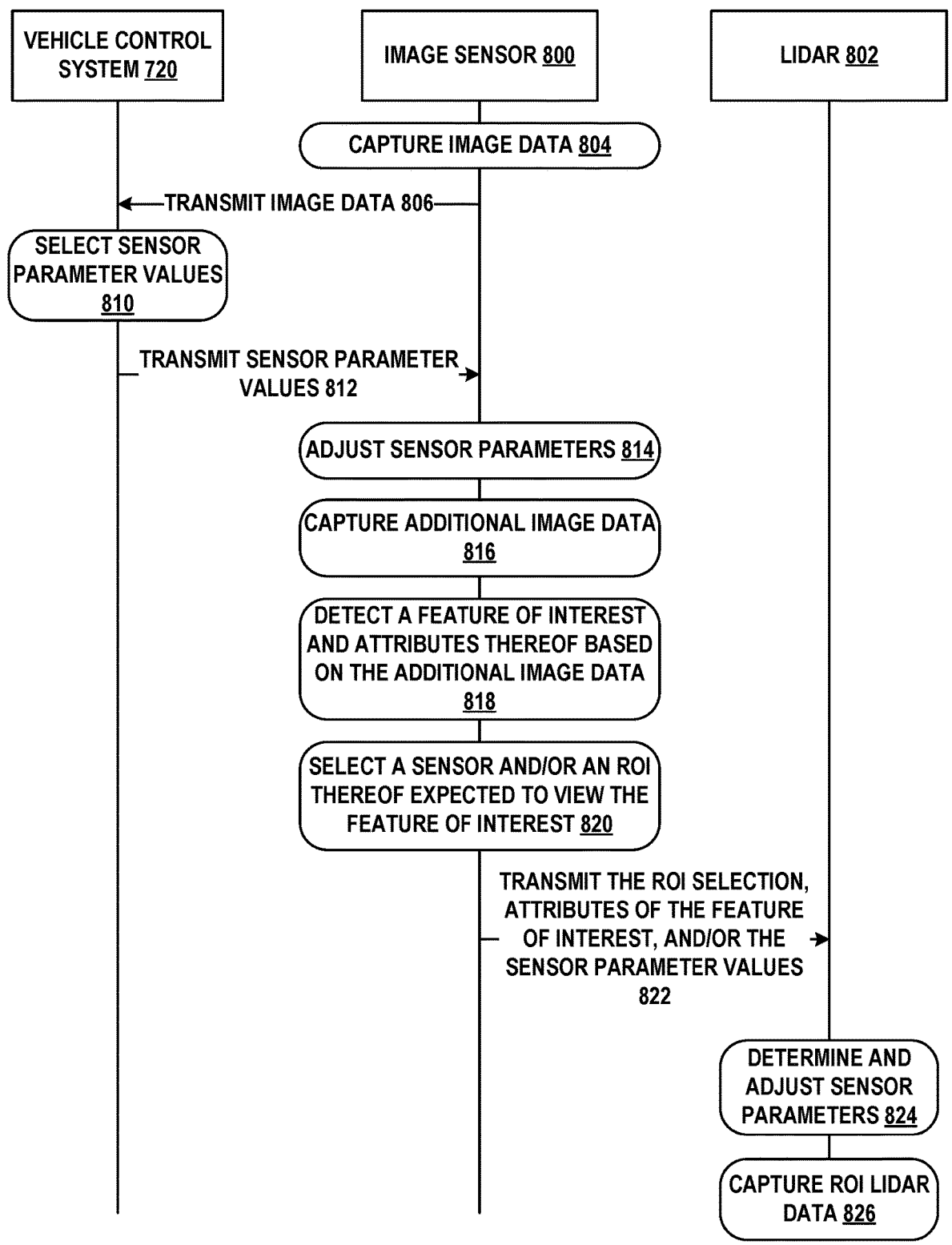
FIG. 8 illustrates peer-to-peer sharing of sensor parameter values, in accordance with example embodiments.

FIG. 8 illustrates an example process for sharing one or more of ROI selections, attributes of a feature of interest, and/or sensor parameter values among multiple sensors by way of a peer-to-peer connection between the sensors. Specifically, FIG. 8 illustrates vehicle control system 720, image sensor 800, which may be one of image sensor(s) 706, and LIDAR 802, which may be one of LIDAR(s) 702. Image sensor 800 may be configured to capture image data of an environment, as indicated by block 804. Based on or in response to capturing the image data at block 804, image sensor 800 may be configured to transmit the image data to vehicle control system 720, as indicated by arrow 806. This transmission may be executed by way of connection 728.

Based on or in response to reception of the image data at arrow 806, vehicle control system 720 may be configured to select sensor parameter values for image sensor 800, as indicated by block 810. The selected sensor parameter values may be based on the initial image data captured at block 804, and may be selected to improve the quality of future images captured in the environment represented by the initial image data. Based on or in response to selection of the sensor parameter values at block 810, vehicle control system 720 may be configured to transmit the sensor parameter values to image sensor 800, as indicated by arrow 812.

Again, this transmission may be executed by way of connection 728. In alternative implementation, rather than relying on vehicle control system 720 to select the sensor parameter values, this operation may be performed by the control circuitry provided as part of image sensor 800.

Based on or in response to selection and/or reception of the sensor parameter values, image sensor 800 may be configured to adjust the sensor parameters to the selected values. By doing so, image sensor 800 may capture additional image data that is of higher quality (e.g., has a better exposure, magnification, white balance, etc.) than the initial image data captured at block 804. Thus, based on or in response to adjusting the sensor parameters at block 814, image sensor 800 may be configured to capture the additional image data, as indicated by block 816.

Based on or in response to capturing the additional image data at block 816, image sensor 800 may be configured to detect a feature of interest within the additional image data and determine the attributes of the detected feature of interest, as indicated by block 818. This detection may be performed by the control circuitry that is provided as part of image sensor 800 (e.g., control circuitry 708). Based on or in response to detecting the feature of interest at block 818, image sensor 800 may be configured to select another sensor and/or an ROI of that sensor expected to view the feature of interest at a future time, as indicated by block 820.

To that end, the control circuitry of image sensor 800 may be configured to predict, based on attributes of the feature of interest, a future location relative to vehicle 700 at which the feature of interest will be observed. The control circuitry may also determine which of the sensors on vehicle 700 will view (e.g., in the case of fixed sensors) and/or may be repositioned to view (e.g., in the case of sensors having adjustable poses) the feature of interest at the future time. Further, the control circuitry may determine a particular ROI of the determined sensor in which the feature of interest will appear.

Based on selection of the sensor and/or the ROI thereof at block 820, image sensor 800 may be configured to transmit, to LIDAR 802, the ROI selection, the attributes of the feature of interest, and/or the sensor parameter values used by image sensor 800, as indicated by arrow 822. Based on or in response to reception of the ROI selection, the attributes of the feature of interest, and/or the sensor parameter values at arrow 822, LIDAR 802 may be configured to determine a set of sensor parameter values to be used by LIDAR 802 for scanning the feature of interest and adjust the sensor parameters thereof accordingly, as indicated by block 824. Based on or in response to adjustment of the sensor parameters at block 824, LIDAR 802 may be configured to capture ROI LIDAR data of the selected ROI, as indicated by block 826.

In cases where sensor parameter values are shared among two different sensors of the same type (e.g., two image sensors), the sensor parameter values may be shared by the first sensor and used by the second sensor with little to no modification. For example, when a feature of interest is viewed by a first image sensor and subsequently viewed in the same environment by a second image sensor, the sensor parameter values of the first sensor may be usable by the second image sensor without modification. Specifically, the sensor parameters values may be usable without modification because both sensors are of the same type and are imaging the feature of interest in the same or approximately the same environment. In some cases, the sensor parameter values used by the first sensor may be modified based on the attributes of the feature of interest before being applied to the second sensor to further improve the quality of the sensor data captured by the second sensor.

In cases where sensor parameter values are shared among two different sensors of two different types (e.g., image sensor 800 and LIDAR 802), the sensor parameter values used by the second sensor may be determined based on the sensor parameter values of the first sensor. That is, because the sensors are of a different type, each sensor may have a different set of modifiable sensor parameters. Thus, the sensor parameter values of one sensor type might not be directly usable by a sensor of a different type. However, the sensor parameter values of the first sensor may nevertheless be useful in determining the sensor parameter values of the second sensor. In some cases, the sensor parameter values of the first sensor may be used in combination with attributes of the feature of interest to determine a set of sensor parameter values for parameters of the second sensor.

For example, image sensor 800 may share its sensor parameter values with LIDAR 802, as indicated by arrow 822. In some cases, image sensor 800 may also share with LIDAR 802 any attributes of the feature of interest determined by the control circuitry of image sensor 800. The control circuitry of LIDAR 802 may be configured to map the sensor parameter values of image sensor 800 and/or the attributes of the feature of interest to corresponding sensor parameter values for LIDAR 802. For example, a power with which LIDAR 802 transmits a light pulse towards a point in the environment may be determined by the control circuitry of LIDAR 802 based on the distance to the feature of interest and/or the exposure time (which may be indicative of scene brightness) used by image sensor 800.

In another example, LIDAR 802 may select the ROI of image sensor 800 and share therewith the LIDAR parameter values and/or the attributes of the feature of interest determined based on the LIDAR data. In such a case, the exposure time and/or gain of image sensor 800 may be determined based on the reflectivity of the feature of interest measured by LIDAR 802 and/or the power with which LIDAR 802 transmitted light pulses to scan the feature of interest, among other parameters. In another example, a speed of the feature of interest, as measured by LIDAR 802, may be used as a basis for determining a frame rate of image sensor 800.

The mapping between sensor parameter values of different sensor parameters of two different types of sensor may be predetermined or learned over time. In one example, the mapping may be implemented as a machine learning model configured to select sensor parameter values for a sensor of a second type based on attributes or a feature and/or sensor parameter values for a sensor of a first type. The mapping may account for differences in how the different portions of the electromagnetic spectrum utilized by the different types of sensors interact with different types of materials in the environment. In some implementations, the mapping may be further based on attributes of the feature of interest to be scanned using the second sensor of the second type.

VIII. Additional Example Operations

Figure 9:
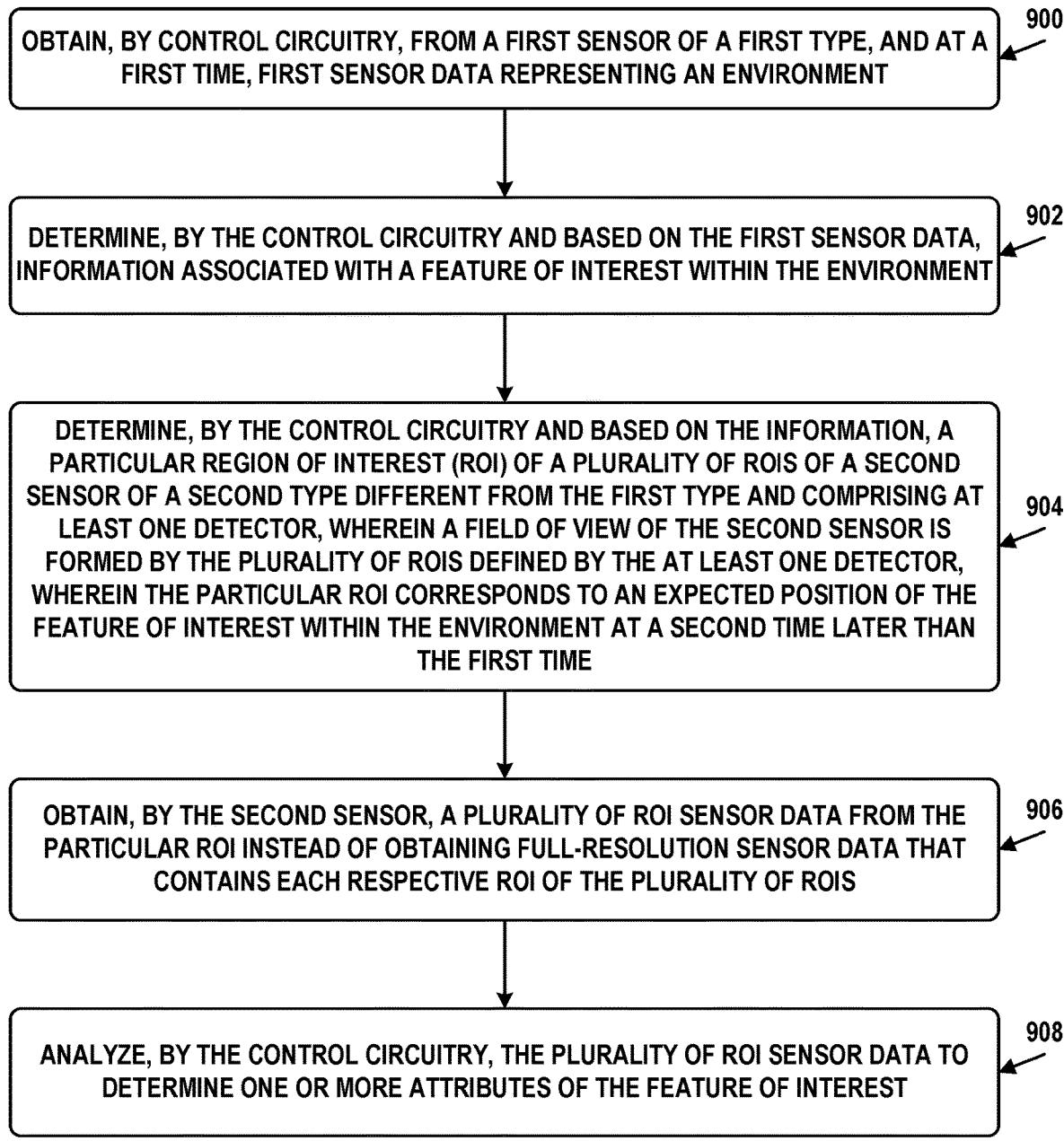
FIG. 9 illustrates a flow chart, in accordance with example embodiments.

FIG. 9 illustrates a flow chart of operations related to selection of a region of interest of a sensor. The operations may be carried out by vehicle 100, vehicle 200, image sensor 400, image sensor 500, control circuitry 604, vehicle 700, and/or components thereof, among other possibilities. However, the operations can also be carried out by other types of devices or device subsystems. For example, the process could be carried out by a server device, an autonomous vehicle, and/or a robotic device.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining, by control circuitry, from a first sensor of a first type, and at a first time, first sensor data representing an environment.

Block 902 may involve determining, by the control circuitry and based on the first sensor data, information associated with a feature of interest within the environment.

Block 904 may involve determining, by the control circuitry and based on the information, a particular ROI of a plurality of ROIs of a second sensor of a second type different from the first type and comprising at least one detector. A field of view of the second sensor may be formed by the plurality of ROIs defined by the at least one detector. The particular ROI may correspond to an expected position of the feature of interest within the environment at a second time later than the first time.

Block 906 may involve obtaining, by the second sensor, a plurality of ROI sensor data from the particular ROI instead of obtaining full-resolution sensor data that contains each respective ROI of the plurality of ROIs.

Block 908 may involve analyzing, by the control circuitry, the plurality of ROI sensor data to determine one or more attributes of the feature of interest.

In some embodiments, a first subset of the control circuitry may form part of the first sensor. A second subset of the control circuitry may form part of the second sensor. The first subset of the control circuitry may be configured to: (i) obtain the first sensor data (block 900), (ii) determine the information associated with the feature of interest (block 902), (iii) select the second sensor from a plurality of sensors of the second type based on a pose of the second sensor with respect to the environment and the expected position of the feature of interest within the environment at the second time, (iv) determine the particular ROI (block 904) further based on selection of the second sensor, and (v) transmit an indication of the particular ROI to the second subset of the control circuitry by way of a peer-to-peer connection between the first sensor and the second sensor. The second subset of the control circuitry may be configured to (i) receive the indication of the particular ROI from the first subset of the control circuitry and (ii) obtain the plurality of ROI sensor data (block 906) in response to reception of the indication.

In some embodiments, a first subset of the control circuitry may form part of the first sensor. A second subset of the control circuitry may form part of the second sensor. The first subset of the control circuitry may be configured to: (i) obtain the first sensor data (block 900), (ii) determine the information associated with the feature of interest (block 902), and (iii) broadcast the expected position of the feature of interest to a plurality of sensors that includes the second sensor by way of a plurality of peer-to-peer connections between the first sensor and the plurality of sensors. The second subset of the control circuitry may be configured to (i) determine, in response to reception of the broadcast and based on a pose of the second sensor with respect to the environment and the expected position of the feature of interest within the environment, the particular ROI of the second sensor expected to view the feature of interest at the second time and (ii) obtain the plurality of ROI sensor data in response to determining the particular ROI (block 906).

In some embodiments, a first subset of the control circuitry may form part of the first sensor. A second subset of the control circuitry may form part of the second sensor. The first subset of the control circuitry may be configured to generate, based on the information associated with the feature of interest, instructions configured to adjust a sensor parameter of the particular ROI of the second sensor. The particular ROI may be expected to contain the feature of interest at the second time based on the expected position. The first subset of the control circuitry may also be configured to transmit the instructions to the second subset of the control circuitry by way of a peer-to-peer connection between the first sensor and the second sensor. The second subset of the control circuitry may be configured to adjust, prior to obtaining the plurality of ROI sensor data, the sensor parameter of the particular ROI according to the instructions.

In some embodiments, the instructions may be further based on a value of at least one sensor parameter used by the first sensor at the first time.

In some embodiments, the second sensor may be an image sensor. The sensor parameter may include one or more of: (i) gain, (ii) exposure time, (iii) white balance, (iv) magnification, or (v) frame rate.

In some embodiments, the first subset of the control circuitry may be further configured to select the second sensor from a plurality of sensors based on (i) a pose of the second sensor with respect to the environment and (ii) the expected position of the feature of interest. The instructions may be generated further based on selection of the second sensor.

In some embodiments, transmitting the instructions may include broadcasting, by the first subset of the control circuitry, the instructions to a plurality of sensors that includes the second sensor. The second subset of the control circuitry may be configured to determine, in response to reception of the broadcast and based on (i) a pose of the second sensor with respect to the environment and (ii) the expected position of the feature of interest within the environment at the second time, that the second sensor is expected to view the feature of interest at the second time. The second subset of the control circuitry may also be configured to adjust the sensor parameter according to the instructions in response to determining that the second sensor is expected to view the feature of interest at the second time.

In some embodiments, the first sensor and the second sensor may be provided on a vehicle having a control system configured to control the vehicle based on data generated by at least one of the first sensor or the second sensor. The transmitting of the instructions and the adjusting of the sensor parameter may be performed independently of the control system.

In some embodiments, the control system may be configured to obtain, from the first sensor and prior to the first time, second sensor data representing a portion of the environment and determine, based on the second sensor data, a value of the sensor parameter to be used by the first sensor at the first time. The control system may also be configured to transmit the value of the sensor parameter to the first subset of the control circuitry. The first subset of the control circuitry may be configured to, in response to reception of the value of the sensor parameter from the control system, adjust the sensor parameter to the value, cause the first sensor to capture the first sensor data after adjusting the sensor parameter to the value, and detect, based on the first sensor data, the feature of interest within the environment.

In some embodiments, the one or more attributes of the feature of interest may include one or more of: (i) geometric properties of the feature of interest, (ii) an actual position of the feature of interest within the environment at the second time, (iii) speed of the feature of interest, (iv) optical flow associated with the feature of interest, (v) a classification of the feature of interest, or (vi) one or more confidence values associated with results of the analyzing of the plurality of ROI sensor data.

In some embodiments, the first sensor may include a light detection and ranging (LIDAR) device. The second sensor may include an image sensor. The at least one detector may include a plurality of pixels. The plurality of ROI sensor data may include a plurality of ROI images. The information associated with the feature of interest may include a reflectivity of the feature of interest. The control circuitry may be configured to determine, based on the reflectivity of the feature of interest, at least one of (i) an exposure value of an exposure parameter of the particular ROI or (ii) a gain value of a gain parameter of the particular ROI. The control circuitry may be further configured to, prior to obtaining the plurality of ROI images, adjusting at least one of (i) the exposure parameter of the particular ROI to the exposure value or (ii) the gain parameter of the particular ROI to the gain value.

In some embodiments, the first sensor may include at least one of (i) a LIDAR device or (ii) a radio detection and ranging (RADAR) device. The second sensor may include an image sensor. The at least one detector may include a plurality of pixels. The plurality of ROI sensor data may include a plurality of ROI images. The information associated with the feature of interest may include a speed of the feature of interest. The control circuitry may be configured to determine, based on the speed of the feature of interest, a frame rate value of a frame rate parameter of the particular ROI and, prior to obtaining the plurality of ROI images, adjusting the frame rate parameter of the particular ROI to the frame rate value.

In some embodiments, the control circuitry may include neural network circuitry. Determining the information associated with the feature of interest may include analyzing the first sensor data using the neural network circuitry and generating, by way of the neural network circuitry, neural network output data related to results of the analyzing of the first sensor data.

In some embodiments, the first sensor and the second sensor may be co-located within a shared housing.

In some embodiments, each of the first sensor of the first type and the second sensor of the second type may include at least one of: (i) a camera device, (ii) a light detection and ranging (LIDAR) device, (iii) a radio detection and ranging (RADAR) device, (iv) a thermal imaging device, or (v) an ultrasonic imaging device.

In some embodiments, the second sensor may include (i) a transmitter configured to emit electromagnetic radiation within a first frequency range. The at least one detector may be configured to detect the electromagnetic radiation within the first frequency range. The control circuitry may be configured to determine, based on the information associated with the feature of interest, a power with which to emit the electromagnetic radiation towards the feature of interest, cause the transmitter to emit the electromagnetic radiation towards the feature of interest with the determined power, and obtain the plurality of ROI sensor data based on a reflection of the electromagnetic radiation from the feature of interest.

In some embodiments, the first sensor may include a thermal camera configured to generate radiometric images. The second sensor may include an image sensor. The at least one detector may include a plurality of pixels. The plurality of pixels may form a plurality of pixel groups each comprising two or more respective pixels. The plurality of ROI sensor data may include a plurality of ROI images. One or more ROI images of the plurality of ROI images may be low-light ROI images that have a lower resolution than a maximum resolution of the particular ROI. The low-light ROI images may be generated by binning the two or more respective pixels of each pixel group within the particular ROI.

In some embodiments, the control circuitry may be configured to determine, based on the information associated with the feature of interest, a sensor parameter value for a sensor parameter of the particular ROI and, prior to obtaining the plurality of ROI sensor data, adjusting the sensor parameter to the sensor parameter value.

In some embodiments, the information associated with the feature of interest may include a distance between the first sensor and the feature of interest. The control circuitry may be configured to compare the distance to a threshold distance and, based on results of comparing the distance to the threshold distance, obtain the plurality of ROI sensor data instead of obtaining the full-resolution sensor data.

In some embodiments, the information associated with the feature of interest may include a speed of the feature of interest. The control circuitry may be configured to compare the speed of the feature of interest to a threshold speed and, based on results of comparing the speed to the threshold speed, obtain the plurality of ROI sensor data instead of obtaining the full-resolution sensor data.

In some embodiments, the first sensor may include a LIDAR device. The second sensor may include an image sensor. The at least one detector may include a plurality of pixels. The control circuitry may be configured to generate a point cloud representing the environment based on the first sensor data, determine the information associated with the feature of interest based on the point cloud, and determine the particular ROI based on a position of the feature of interest within the point cloud.

In some embodiments, the full-resolution sensor data may be second full-resolution sensor data. The control circuitry may be configured to obtain, from the second sensor and at the first time, first full-resolution sensor data that contains each respective ROI of the plurality of ROIs. The information associated with the feature of interest may be determined further based on the first full-resolution sensor data. The particular ROI may be determined further based on the first full-resolution sensor data.

In some embodiments, the first full-resolution sensor data may be obtained at a first frame rate. The plurality of ROI sensor data may be obtained at a second frame rate higher than the first frame rate.

In some embodiments, the first sensor may include a thermal camera configured to generate radiometric images. The second sensor may include an image sensor. The at least one detector may include a plurality of pixels. The plurality of pixels may form a plurality of pixel groups each comprising two or more respective pixels. The first full-resolution sensor data may be a low-light image that has a lower resolution than a maximum resolution of the image sensor.

The low-light image may be generated by binning the two or more respective pixels of each pixel group of the plurality of pixel groups.

In some embodiments, the control circuitry may include one or more layers of an integrated circuit. At least one layer of the integrated circuit may include the at least one detector. The control circuitry may be configured to transmit the first sensor data and the one or more attributes to a processor communicatively connected to the integrated circuit.

In some embodiments, the control circuitry may include (i) an integrated circuit and (ii) a processor communicatively connected to the integrated circuit. The integrated circuit may be configured to obtain the first sensor data and the plurality of ROI sensor data and transmit the first sensor data and the plurality of ROI sensor data to the processor. The processor may be configured to determine the information associated with the feature of interest, determine the particular ROI, and analyze the plurality of ROI sensor data.

In some embodiments, a pose of the second sensor may be fixed with respect to the first sensor. Determining the particular ROI may include determining the particular ROI based on the pose of the second sensor with respect to the first sensor.

In some embodiments, a pose of the second sensor may be adjustable with respect to the first sensor. Determining the particular ROI may include determining the particular ROI based on the pose of the second sensor with respect to the first sensor.

In some embodiments, each respective ROI of the plurality of ROIs may be fixed with respect to the at least one detector. The respective ROI may be mutually exclusive of other ROIs of the plurality of ROIs.

In some embodiments, a subset of the at least one detector that defines a respective ROI of the plurality of ROIs may be modifiable such that at least one of a size of the respective ROI or a position of the respective ROI is reconfigurable.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:
1. A system comprising:
a first sensor of a first type;
a second sensor of a second type different from the first type and comprising at least one detector, wherein a field of view of the second sensor is formed by a plurality of regions of interest (ROIs) defined by the at least one detector; and control circuitry configured to perform operations comprising:

obtaining, from the first sensor and at a first time, first sensor data representing an environment;

determining, based on the first sensor data, information associated with a feature of interest within the environment;

determining, based on the information, a particular ROI of the plurality of ROIs of the second sensor that corresponds to an expected position of the feature of interest within the environment at a second time later than the first time;

obtaining, from the second sensor, a plurality of ROI sensor data from the particular ROI instead of obtaining full-resolution sensor data that contains each respective ROI of the plurality of ROIs; and analyzing the plurality of ROI sensor data to determine one or more attributes of the feature of interest.

2. The system of claim 1, wherein a first subset of the control circuitry forms part of the first sensor, wherein a second subset of the control circuitry forms part of the second sensor, wherein the first subset of the control circuitry is configured to: (i) obtain the first sensor data, (ii) determine the information associated with the feature of interest, (iii) select the second sensor from a plurality of sensors of the second type based on a pose of the second sensor with respect to the environment and the expected position of the feature of interest within the environment at the second time, (iv) determine the particular ROI further based on selection of the second sensor, and (v) transmit an indication of the particular ROI to the second subset of the control circuitry by way of a peer-to-peer connection between the first sensor and the second sensor, and wherein the second subset of the control circuitry is configured to receive the indication of the particular ROI from the first subset of the control circuitry and obtain the plurality of ROI sensor data in response to reception of the indication.

3. The system of claim 1, wherein a first subset of the control circuitry forms part of the first sensor, wherein a second subset of the control circuitry forms part of the second sensor, wherein the first subset of the control circuitry is configured to: (i) obtain the first sensor data, (ii) determine the information associated with the feature of interest and (iii) broadcast the expected position of the feature of interest to a plurality of sensors that includes the second sensor by way of a plurality of peer-to-peer connections between the first sensor and the plurality of sensors, wherein the second subset of the control circuitry is configured to determine, in response to reception of the broadcast and based on a pose of the second sensor with respect to the environment and the expected position of the feature of interest within the environment, the particular ROI of the second sensor expected to view the feature of interest at the second time and obtain the plurality of ROI sensor data in response to determining the particular ROI.

4. The system of claim 1, wherein a first subset of the control circuitry forms part of the first sensor, wherein a second subset of the control circuitry forms part of the second sensor, and wherein the operations further comprise:

generating, by the first subset of the control circuitry and based on the information associated with the feature of interest, instructions configured to adjust a sensor parameter of the particular ROI of the second sensor, wherein the particular ROI is expected to contain the feature of interest at the second time based on the expected position;

transmitting, by the first subset of the control circuitry, the instructions to the second subset of the control circuitry by way of a peer-to-peer connection between the first sensor and the second sensor; and adjusting, by the second subset of the control circuitry and prior to obtaining the plurality of ROI sensor data, the sensor parameter of the particular ROI according to the instructions.

5. The system of claim 4, wherein the instructions are further based on a value of at least one sensor parameter used by the first sensor at the first time.

6. The system of claim 4, wherein the second sensor is an image sensor, and wherein the sensor parameter comprises at least one of: (i) gain, (ii) exposure time, (iii) white balance, (iv) magnification, or (v) frame rate.

7. The system of claim 4, further comprising:

a vehicle; and a control system configured to control the vehicle based on data generated by at least one of the first sensor or the second sensor, wherein the transmitting of the instructions and the adjusting of the sensor parameter are performed independently of the control system.

8. The system of claim 7, wherein the control system is configured to:

obtain, from the first sensor and prior to the first time, second sensor data representing a portion of the environment;

determine, based on the second sensor data, a value of the sensor parameter to be used by the first sensor at the first time; and transmit the value of the sensor parameter to the first subset of the control circuitry, wherein the first subset of the control circuitry is configured to:

in response to reception of the value of the sensor parameter from the control system, adjust the sensor parameter to the value;

cause the first sensor to capture the first sensor data after adjusting the sensor parameter to the value; and detect, based on the first sensor data, the feature of interest within the environment.

9. The system of claim 1, wherein the one or more attributes of the feature of interest comprise one or more of: (i) geometric properties of the feature of interest, (ii) an actual position of the feature of interest within the environment at the second time, (iii) a speed of the feature of interest, (iv) an optical flow associated with the feature of interest, (v) a classification of the feature of interest, or (vi) one or more confidence values associated with results of the analyzing of the plurality of ROI sensor data.

10. The system of claim 1, wherein the first sensor comprises a light detection and ranging (LIDAR) device, wherein the second sensor comprises an image sensor, wherein the at least one detector comprises a plurality of pixels, wherein the plurality of ROI sensor data comprise a plurality of ROI images, wherein the information associated with the feature of interest comprises a reflectivity of the feature of interest, and wherein the operations further comprise:

determining, based on the reflectivity of the feature of interest, at least one of an exposure value of an exposure parameter of the particular ROI or a gain value of a gain parameter of the particular ROI; and prior to obtaining the plurality of ROI images, adjusting at least one of the exposure parameter of the particular ROI to the exposure value or the gain parameter of the particular ROI to the gain value.

11. The system of claim 1, wherein the first sensor comprises at least one of (i) a light detection and ranging (LIDAR) device or (ii) a radio detection and ranging (RADAR) device, wherein the second sensor comprises an image sensor, wherein the at least one detector comprises a plurality of pixels, wherein the plurality of ROI sensor data comprise a plurality of ROI images, wherein the information associated with the feature of interest comprises a speed of the feature of interest, and wherein the operations further comprise:
  determining, based on the speed of the feature of interest, a frame rate value of a frame rate parameter of the particular ROI; and
  prior to obtaining the plurality of ROI images, adjusting the frame rate parameter of the particular ROI to the frame rate value.

12. The system of claim 1, wherein the control circuitry comprises neural network circuitry, and wherein determining the information associated with the feature of interest comprises:
  analyzing the first sensor data using the neural network circuitry; and
  generating, by way of the neural network circuitry, neural network output data related to results of the analyzing of the first sensor data.

13. The system of claim 1, wherein the first sensor and the second sensor are co-located within a shared housing.

14. The system of claim 1, wherein each of the first sensor of the first type and the second sensor of the second type comprises at least one of: (i) a camera device, (ii) a light detection and ranging (LIDAR) device, (iii) a radio detection and ranging (RADAR) device, (iv) a thermal imaging device, or (v) an ultrasonic imaging device.

15. The system of claim 1, wherein the second sensor comprises (i) a transmitter configured to emit electromagnetic radiation within a first frequency range, wherein the at least one detector is configured to detect the electromagnetic radiation within the first frequency range, and wherein the operations further comprise:
  determining, based on the information associated with the feature of interest, a power with which to emit the electromagnetic radiation towards the feature of interest;
  causing the transmitter to emit the electromagnetic radiation towards the feature of interest with the determined power; and
  obtaining the plurality of ROI sensor data based on a reflection of the electromagnetic radiation from the feature of interest.

16. The system of claim 1, wherein the first sensor comprises a thermal camera configured to generate radiometric images, wherein the second sensor comprises an image sensor, wherein the at least one detector comprises a plurality of pixels, wherein the plurality of pixels form a plurality of pixel groups each comprising two or more respective pixels, wherein the plurality of ROI sensor data comprise a plurality of ROI images, wherein one or more ROI images of the plurality of ROI images are low-light ROI images that have a lower resolution than a maximum resolution of the particular ROI, and wherein the low-light ROI images are generated by binning the two or more respective pixels of each pixel group within the particular ROI.

17. The system of claim 1, wherein the full-resolution sensor data is a second full-resolution sensor data, and wherein the operations further comprise:
  obtaining, from the second sensor and at the first time, a first full-resolution sensor data that contains each respective ROI of the plurality of ROIs, wherein the information associated with a feature of interest is determined further based on the first full-resolution sensor data, and wherein the particular ROI is determined further based on the first full-resolution sensor data.

18. The system of claim 17, wherein the first sensor comprises a thermal camera configured to generate radiometric images, wherein the second sensor comprises an image sensor, wherein the at least one detector comprises a plurality of pixels, wherein the plurality of pixels form a plurality of pixel groups each comprising two or more respective pixels, wherein the first full-resolution sensor data is a low-light image that has a lower resolution than a maximum resolution of the image sensor, and wherein the low-light image is generated by binning the two or more respective pixels of each pixel group of the plurality of pixel groups.

19. A method comprising:
  obtaining, by control circuitry, from a first sensor of a first type, and at a first time, first sensor data representing an environment;
  determining, by the control circuitry and based on the first sensor data, information associated with a feature of interest within the environment;
  determining, by the control circuitry and based on the information, a particular region of interest (ROI) of a plurality of ROIs of a second sensor of a second type different from the first type and comprising at least one detector, wherein a field of view of the second sensor is formed by the plurality of ROIs defined by the at least one detector, wherein the particular ROI corresponds to an expected position of the feature of interest within the environment at a second time later than the first time;
  obtaining, by the second sensor, a plurality of ROI sensor data from the particular ROI instead of obtaining full-resolution sensor data that contains each respective ROI of the plurality of ROIs; and
  analyzing, by the control circuitry, the plurality of ROI sensor data to determine one or more attributes of the feature of interest.

20. A non-transitory computer readable storage medium having stored thereon instructions that, when executed by a computing device, cause the computing device to perform operations comprising:
  obtaining, from a first sensor of a first type and at a first time, first sensor data representing an environment;
  determining, based on the first sensor data, information associated with a feature of interest within the environment;
  determining, based on the information, a particular region of interest (ROI) of a plurality of ROIs of a second sensor of a second type different from the first type and comprising at least one detector, wherein a field of view of the second sensor is formed by the plurality of ROIs defined by the at least one detector, wherein the particular ROI corresponds to an expected position of the feature of interest within the environment at a second time later than the first time;
  obtaining a plurality of ROI sensor data from the particular ROI instead of obtaining full-resolution sensor data that contains each respective ROI of the plurality of ROIs; and analyzing the plurality of ROI sensor data to determine one or more attributes of the feature of interest.

\* \* \* \* \*